US011947599B1

(12) United States Patent
Knuesel

(10) Patent No.: US 11,947,599 B1
(45) Date of Patent: Apr. 2, 2024

(54) DATA CONFIDENTIALITY-PRESERVING MACHINE LEARNING ON REMOTE DATASETS

(71) Applicant: SAP SE, Walldorf (DE)

(72) Inventor: Philipp Knuesel, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/974,853

(22) Filed: Oct. 27, 2022

Related U.S. Application Data

(60) Provisional application No. 63/407,402, filed on Sep. 16, 2022.

(51) Int. Cl.
*G06F 16/903* (2019.01)
*G06F 16/25* (2019.01)
*G06Q 10/0631* (2023.01)

(52) U.S. Cl.
CPC ...... *G06F 16/90335* (2019.01); *G06F 16/252* (2019.01); *G06Q 10/0631* (2013.01)

(58) Field of Classification Search
CPC ........ G06F 16/23; G06F 16/25; G06F 16/252; G06F 16/90335
See application file for complete search history.

(56) References Cited

U.S. PATENT DOCUMENTS

| 11,544,236 | B2 * | 1/2023 | Brown | G06F 16/21 |
| 2018/0288028 | A1 * | 10/2018 | Buck | G06F 9/45558 |
| 2019/0294519 | A1 * | 9/2019 | Garg | G06F 11/3034 |
| 2020/0272947 | A1 * | 8/2020 | Carullo | G06F 16/355 |
| 2021/0326736 | A1 * | 10/2021 | Kishimoto | G06F 18/217 |
| 2022/0114032 | A1 * | 4/2022 | Guim Bernat | H04L 67/1001 |
| 2022/0300850 | A1 * | 9/2022 | Mendez | G06N 20/00 |

OTHER PUBLICATIONS

U.S. Appl. No. 17/974,892, filed Oct. 27, 2022, Knuesel.
Wikipedia.org [online], "Functional testing" created on Aug. 4, 2006, retrieved on Oct. 27, 2022, retrieved from URL <https://en.wikipedia.org/wiki/Functional_testing>, 3 pages.
(Continued)

*Primary Examiner* — James E Richardson
(74) *Attorney, Agent, or Firm* — Fish & Richardson P.C.

(57) ABSTRACT

The present disclosure involves systems, software, and computer implemented methods for data confidentiality-preserving machine learning on remote datasets. An example method includes receiving connection information for connecting to a remote customer database and storing the connection information in a machine learning runtime. Workload schedule information for allowable time windows for machine learning pipeline execution on remote customer data of the customer is received from the customer. A determination is made that an execution queue includes a machine learning pipeline during an allowed time window. The connection information is used to connect to the remote customer database during the allowed time window. Execution is triggered by the machine learning runtime of the machine learning pipeline on the remote customer database. Aggregate evaluation data corresponding to the execution of the machine learning pipeline on the remote customer database is received and provided to a user.

20 Claims, 18 Drawing Sheets

(56) References Cited

OTHER PUBLICATIONS

Wikipedia.org [online], "Pseudonymization" created on Feb. 24, 2020, retrieved on Oct. 27, 2022, retrieved from URL <https://en.wikipedia.org/wiki/Pseudonymization>, 6 pages.
Wikipedia.org [online], "Staging (Data)" created on Apr. 23, 2009, retrieved on Oct. 27, 2022, retrieved from URL <https://en.wikipedia.org/wiki/Staging_(data)>, 3 pages.
Wikipedia.org [online], "Unit Testing" created on May 7, 2003, retrieved on Oct. 27, 2022, retrieved from URL <https://en.wikipedia.org/wiki/Unit_testing>, 9 pages.

* cited by examiner

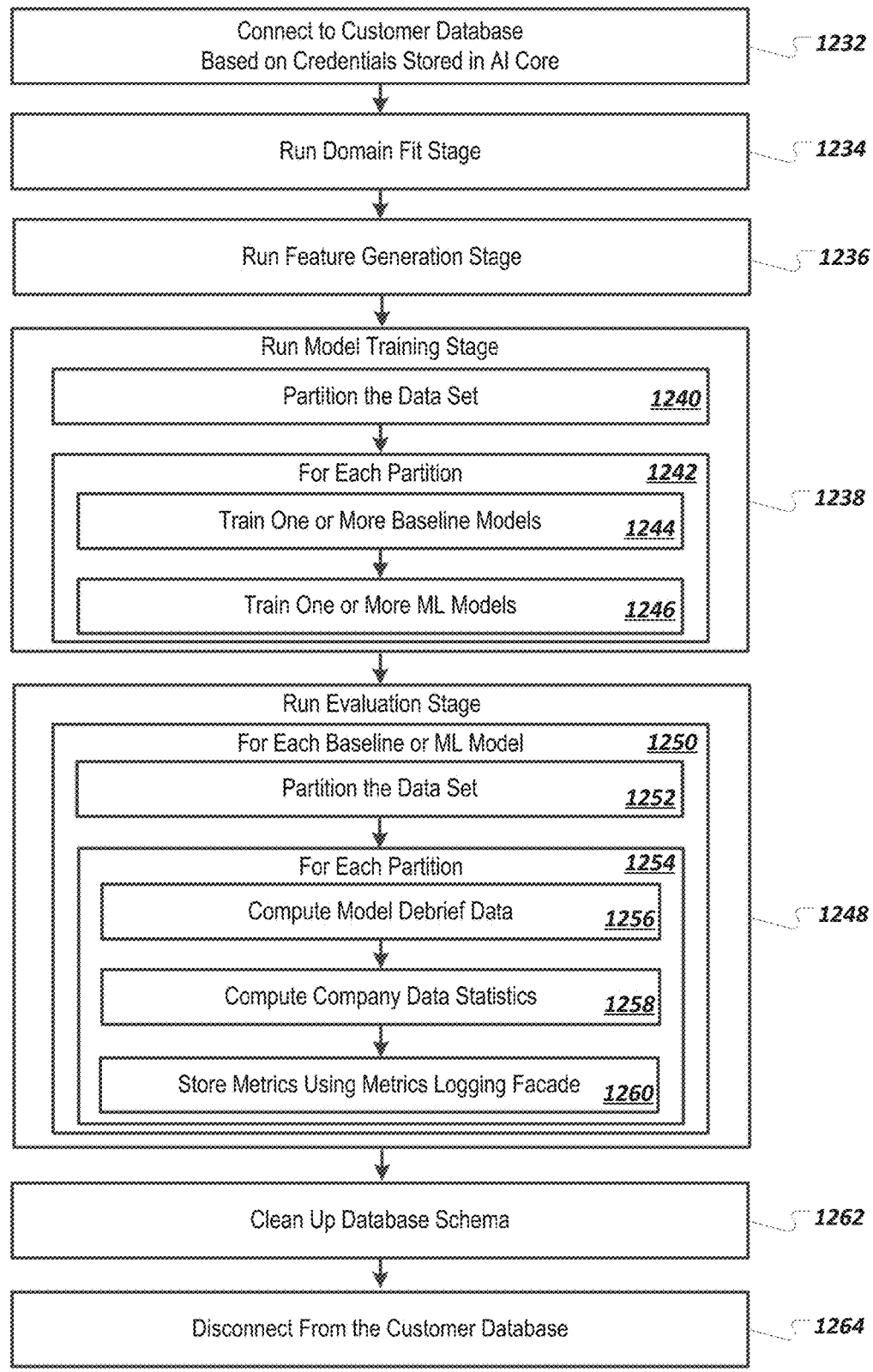

DATA CONFIDENTIALITY-PRESERVING MACHINE LEARNING ON REMOTE DATASETS

CLAIM OF PRIORITY

This application claims priority under 35 USC § 119(e) to U.S. Patent Application Ser. No. 63/407,402, filed on Sep. 16, 2022 the entire contents of which are hereby incorporated by reference.

TECHNICAL FIELD

The present disclosure relates to computer-implemented methods, software, and systems for enabling artificial intelligence algorithms on customer data while preserving customer data privacy.

BACKGROUND

An ERP system can be used by an organization for integrated management of organizational processes. The ERP system can include a database that can store objects that are used in numerous, core processes of the organization. Some processes that can be managed by an ERP system include resource tracking, payroll, sales orders, purchase orders, and invoicing, to name a few examples.

SUMMARY

The present disclosure involves systems, software, and computer implemented methods for enabling artificial intelligence algorithms on customer data while preserving customer data privacy. An example method includes: receiving, from a customer administrator of a customer, connection information for connecting to a remote customer database of the customer; storing the connection information for connecting to the remote customer database in a machine learning runtime for machine learning pipeline execution on remote customer data; receiving, from the customer administrator, workload schedule information for allowable time windows for machine learning pipeline execution on remote customer data of the customer; storing the received workload schedule information; determining that an execution queue includes a machine learning pipeline during an allowed time window; using the connection information to connect to the remote customer database during the allowed time window; triggering execution by the machine learning runtime of the machine learning pipeline on the remote customer database during the allowed time window; receiving aggregate evaluation data corresponding to the execution of the machine learning pipeline on the remote customer database; and providing the aggregate evaluation data to a user.

Implementations may include one or more of the following features. The connection information can be received from the customer administrator after the customer has been onboarded to a customer tenant of a software system for executing machine learning pipelines on remote customer datasets. An offboarding request can be received from the customer administrator to offboard the customer the software system for executing machine learning pipelines on remote customer datasets. The customer tenant can be removed from the software system in response to the offboarding request. A monitoring request can be received from the customer administrator to monitor execution of the machine learning pipeline. Machine learning pipeline execution information for execution of the machine learning pipeline can be identified and provided to the customer administrator in response to the monitoring request. A halt execution request can be received from the customer administrator to halt execution of the machine learning pipeline. A halt execution instruction can be provided to the machine learning runtime to halt execution of the machine learning pipeline in response to the halt execution request. The machine learning runtime can perform a pre-check before executing the machine learning pipeline on the remote customer database. The pre-check can include: determining whether a connection to the remote customer database can be established based on the connection information stored in the machine learning runtime for the customer; identifying a machine learning pipeline database schema associated with the machine learning pipeline; determining whether the machine learning pipeline database schema exists in the remote customer database; determining whether the connection information stored in the machine learning runtime for the customer enables access to the machine learning pipeline database schema in the remote customer database; and determining whether the connection information stored in the machine learning runtime for the customer enables access only to the machine learning pipeline database schema and not other database schemas in the remote customer database. The machine learning pipeline can belong to a machine learning project that includes source code and metadata. A monitoring request can be received from a customer data owner to monitor the machine learning project. Information on processed data including a list of processed objects and information on machine learning pipelines, including a list of machine learning pipeline executions, can be provided to the customer data owner, in response to the monitoring request. Evaluation data for a particular machine learning pipeline execution can also be provided in response to the monitoring request. The data machine learning project metadata can include a definition of the database tables and fields relevant to the machine learning project. Before executing the machine learning pipeline, the machine learning runtime can trigger a data replication from a production remote customer database into the remote customer database connected to the machine learning runtime, based on the definition of database tables and fields.

Another example method includes: connecting to the remote customer database that includes the remote customer dataset using connection information provided by the customer; determining whether data of the remote customer dataset is of sufficient quality and quantity for a machine learning pipeline to be executed on the remote customer dataset; in response to determining that data of the remote customer dataset is of sufficient quality and quantity, generating, in the remote customer database, feature data corresponding to the machine learning pipeline; partitioning the remote customer dataset into one or more data partitions; for each partition of the one or more data partitions: training, using a machine learning library included in the remote customer database, one or more baseline models for the machine learning pipeline using a subset of the feature data; training, using the machine learning library included in the remote customer database, one or more machine learning models for the machine learning pipeline using the feature data; generating aggregate evaluation data for each baseline model and each machine learning model, wherein the aggregate evaluation data includes model debrief data and customer data statistics; and storing the aggregate evaluation data; determining that the customer has enabled sharing of the aggregate evaluation data with a software provider who provided the remote customer database to the customer; and providing the aggregate evaluation data to the software provider.

Implementations can include one or more of the following features. The method cam be performed in response to determining that the machine learning pipeline has been added to an execution queue. The machine learning pipeline can be added to the execution queue after successful completion of a build process. The build process can include: determining that the machine learning pipeline has been checked into a code repository; performing unit testing of the machine learning pipeline; building an executable image of the machine learning pipeline; deploying the executable image of the machine learning pipeline to a staging repository; and performing function testing using the executable image of the machine learning pipeline. Building the executable image can include excluding machine learning pipeline code that has not been flagged for execution on remote customer datasets. Performing function testing can include: triggering execution of the machine learning pipeline against at least one acceptance dataset; determining that the execution of the machine learning pipeline against the at least one acceptance dataset has completed; retrieving metrics generated during execution of the machine learning pipeline against the at least one acceptance dataset; comparing the retrieved metrics against expected threshold values; and determining whether the function testing has succeeded based on the comparing. The machine learning pipeline can access the customer data through a data compatibility layer that abstracts from software version dependent differences. The data compatibility layer can determine a software system and version in use and create views so that a used data model has a common format. The aggregate evaluation data can be determined based on a pseudonymized version of original customer data. Numeric customer data can be standardized and categorical customer data can be tokenized. The aggregate evaluation data can be determined for every baseline or machine learning model and for each of one or more data partitions. The model debrief data can include standard and custom metrics. Company data statistics can include, for each customer data field, a cumulative distribution function for numeric data and a histogram for categorical data. A set of database objects created in the remote customer database for the machine learning pipeline can be identified and removed from the remote customer database after machine learning pipeline completion. A disconnect operation can be performed to disconnect from the remote customer database after removing the set of database objects created for the machine learning pipeline.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 12B illustrates an example machine learning pipeline runtime process.

DETAILED DESCRIPTION

Figure 1:
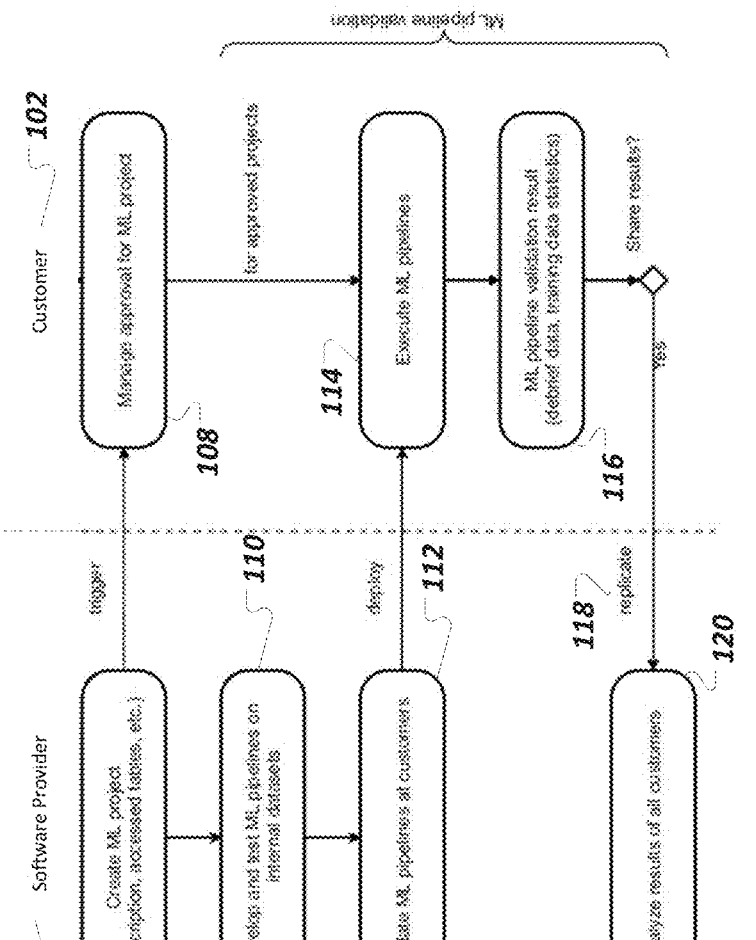
FIG. 1 is a flowchart of an example process for automatically and iteratively validating and optimizing AI algorithms on customer systems.

Artificial Intelligence (AI) algorithms are intelligent algorithms that can be applied in different contexts, such as ERP systems. Machine learning (ML) algorithms can be referred to as a subset of AI technology. Although some specific examples and terminology below may refer to ML, the methods and systems described herein can be applied to any AI or ML algorithm or model. Additionally, although some examples below refer to ERP systems and/or ERP data, the methods and systems described herein can be applied in general with respect to other types of software system providers and customers of the software system provider.

Customers of ERP systems may desire to use intelligent processes in the ERP systems that leverage artificial intelligence (AI) technology. However, customers may have concerns and hesitations regarding sharing customer data with an ERP system provider. Large enterprises may be particularly reluctant to share data, for example. Such concerns may be understandable, but can pose a challenge for machine learning (ML) or AI algorithms which may require substantial amounts of data for training. For example, for AI algorithms to be efficient and useful for a customer, the algorithms generally should be trained using that customer's data. Pre-trained models not trained on customer-specific data may not be accurate or useful for that customer, for example. For instance, a given company's data is often unique to that company, since organizational processes and data generally differ substantially between companies.

Accordingly, the ERP system provider generally desires access to substantial amounts of highly diverse customer-specific data sets in order to create effective artificial intelligence-based features in the ERP system that can work out-of-the-box for different heterogeneous customers. However, availability of customer data may be limited, which may limit effective training of AI algorithms which may rely on data for training.

To alleviate customer concerns about sharing customer-specific data with the ERP system provider, an AI solution can be provided in which AI algorithms can be delivered to the customer data, rather than delivering the customer data to the ERP system provider for processing. In other words, with the AI solution, customers are not required to share customer data with the ERP system provider, because the ERP system provider can deliver the AI algorithms to the customer data and train and evaluate the AI algorithms on the customer systems using the customer data. No raw customer data need ever leave a customer's premises, for example, thus preserving confidentiality of customer data.

The AI solution of delivering AI algorithms to customers provides various advantages over prior solutions that involve transferring customer data to an ERP system. For example, confidentiality of a customer's data is preserved by design, as no raw customer data ever leaves the customer's premises. Because the customer data is processed fully automatically without involvement of any person of the software vendor, personal data can be processed by the AI solution without anonymization. Accordingly, complicated and resource-intensive anonymization of customer data can avoided, unlike systems if personal data was shared in a traditional way using data replication. Additionally, in practice with data replication contexts, perfect anonymization of personal data can be very difficult to achieve, which can therefore result in risks for potentially both the customer and the software vendor when done improperly. Avoiding data replication with the AI solution avoids these risks. As another advantage, the AI solution provides a lower entry barrier for customers to collaborate with the ERP system provider on AI-based ERP features, as all a customer shares with the ERP system provider is highly-aggregated telemetry data.

The AI solution provides various advantages for testing AI applications. For example, the ERP system provider can test AI-based ERP applications rather having to rely on customer testing of those applications. As another example, the ERP system provider can test upgrades of existing AI-based applications prior to shipment, using current customer data, to validate the application before the applications are shipped to customers. Furthermore, the ERP system provider can pro-actively inform customers on how well an AI-based application performs for the customer. For instance, the ERP system provider can pro-actively inform customers if AI-based applications start to show deteriorating performance.

The ERP system provider and the customer can benefit from substantial reductions in development lifecycles for AI-based applications, as compared to longer development lifecycles with prior solutions that involve lengthy internal development phases and lengthy implementation lifecycles at customer premises. With such shortened development cycles, the ERP system provider can deliver turnkey AI-based ERP features that truly work out-of-the-box. Adoption of AI offerings by the ERP system provider can therefore increase.

Additionally, the ERP system provider can use more and larger training datasets which are always up-to-date, as compared to prior solutions that involved sending and using snapshot data that immediately ages after being sent. As another advantage, the ERP system provider can avoid cost and legal risks associated with managing and protecting customer datasets and adhering to data protection guidelines, since the ERP system provider never obtains customer data. Customers can also avoid cost and risks associated with data transfer.

The customer can obtain further benefits from more easily incorporating ML and AI into their ERP applications, by having access to robust, high-performing ML models. The customer can leverage out of the box AI/MIL solutions and thereby avoid or reduce a need for having their own data scientists on staff. A customer can be provided before and after information that can measure an effect of application of AI algorithms, including performance information for use of AI applications.

The solutions described herein enable a data scientist at the ERP system provider to learn how well the ML models worked at the customer even without seeing the customer's raw data. For example, evaluation data (which may also be referred to as validation results) can be determined and provided that on the one hand protects the confidentiality of the customer's data and on the other hand informs the data scientist on how well the algorithm worked and why it worked as it did. For example, artificial intelligence algorithms executed on customer data can include instructions to compute, as evaluation data, telemetry data such as model debrief data and company data statistics. Model debrief data and company data statistics are described in more detail below. The generation and transfer of the telemetry data to the data scientist enables the data scientist to engineer and evaluate AI algorithms without needing to see and access the raw data that is used to train the algorithms or models.

Usually, developers of artificial intelligence algorithms work on datasets they have full access to, often by investigating individual data records. The solution described herein provides various other advantages over that traditional approach. For example, evaluation data can be computed across data partitions, rather than an entire dataset, which can provide direct insights into segments of the customer data where the artificial intelligence algorithm worked well or not as well, and thus allowing for a faster root cause analysis of potential issues compared to the traditional approach. As another example, an approach of determining standardized evaluation data from datasets a data scientist doesn't access can scale much better to a large numbers of datasets as compared to a data scientist accessing datasets during ML training. For example, a developer who analyzes in detail individual data records of an input dataset will generally be limited to how many datasets can be prepared and used, and accordingly, a given developer generally will not use a substantial number of datasets in a short period of time. However, by enabling data scientists to run ML algorithms directly on customer data of potentially many customers across a large number of customer datasets, a software provider can rapidly and efficiently deliver artificial intelligence-based ERP applications that work on large numbers of diverse datasets.

Other advantages can be leveraged using a functional testing approach described herein. For example, comprehensive testing of ML software can be performed on a functional level. ML software is, unlike classical software, inherently difficult to test. ML software can only be tested meaningfully if that software is run against one or several known datasets in order to create trained ML models. Once such trained models are available, the metrics determined when evaluating a particular model can be tested (e.g., using accuracy, F1-score, etc.). The solution described herein introduces several components that enable and automate the process of creating trained models on known data and running tests against model metrics. Compliant delivery of software includes comprehensive tests, for example, on a functional level, to meet for example, a level of functional correctness by requiring each new functionality to be tested successfully. Using the ML function testing described herein, the software provider can automatically and compliantly ship ML software to customers in a continuous manner without human interaction. Such automatic delivery can reduce manual effort at the software provider, improve the quality of software that includes ML features, eliminate a risk of error-prone manual testing, achieve shorter development cycles, and ensure that ML software is delivered without regressions.

FIG. 1 is a flowchart of an example process 100 for automatically and iteratively validating and optimizing AI algorithms on customer systems. The process 100 can be used to validate, for example, ML or other AI models or algorithms on customer systems automatically and without a customer 102 sharing any raw customer data with a software provider 104 (e.g., an ERP system provider). The software provider 104 can provide a software system, such as an ERP software system.

At 106, a user at the software provider 104 creates an ML project (or other type of AI project). Creation of the ML project can include specification of a project title and description, a product or functional area related to the project, a project expiration date, project user and role assignments, database tables that may be accessed during execution of project pipelines, or other project metadata. The user may be, for example, a project owner, who may be a product owner or other stakeholder, for example. The project can be an AI scenario with specific goals for a product offered by the software provider, for example. The project can have a project-specific repository in the software system. The project repository can store source code and metadata for ML pipelines included in the ML project. The ML project can include one or more ML pipelines.

At 108, the software provider 104 can request approval from the customer 102 to validate ML pipelines of the ML project using customer data of the customer 102. The customer 102 can, for example, provide an approval to the software provider 104 to use the customer system as a validation system for the ML project.

At 110, a user at the software provider 104 develops one or more ML pipelines for the ML project. The user may be a data scientist associated with the software provider 104, for example. ML pipelines can include code that, when executed against a dataset (e.g., an internal dataset or a remote dataset), produce ML models, debriefing data, and statistics. ML pipelines can be model training pipelines or data exploration pipelines, for example. ML pipelines are described in more detail below. In some cases, the data scientist may develop and/or perform initial testing of the ML pipelines using one or more internal datasets available to the software provider 104. However, the data scientist may want to validate the ML pipeline(s) and execute the ML pipelines on customer data used for customer systems of the customer 102.

At 112, for example, the software provider 104 can initiate a validation process for validating the ML pipelines using customer data of the customer 102, for a ML project that has been approved by the customer 102. At 114, the ML pipeline(s) are executed using customer data of the customer 102, without providing customer data to the software provider 104. As described in more detail below, executing the ML pipeline(s) can include steps of connecting to a customer database and performing domain fit analysis, feature generation, model training, and evaluation. Additionally, database schema cleanup can be performed before disconnecting from the customer database, including removing any database objects that may have been created in the customer database as part of executing the ML pipeline(s).

At 114, validation result data is generated and stored, as a result of executing the ML pipeline(s) using the customer data of the customer 102. Validation results can include debrief data, training data statistics, etc. Validation results can include model accuracy information and aggregated statistical data, without including any original raw customer data. Users of the customer 102 can view the validation results. The customer 102 can also configure which validation results are accessible to the software provider 104.

At 118, validation results are shared with the software provider 104, for validation results that the customer 102 has agreed to share with the software provider 104.

At 120, the software provider 104 can analyze received validation results. The software provider 104 may receive validation results from other customers and can analyze the validation results received from the customer 102 along with validation results received from other customers. The data scientist of the software provider 104 may iteratively optimize or tune the ML pipelines based on the validation results, and initialize further validation runs of modified ML pipelines, at the customer 102 (and/or at other customers).

Figure 2:
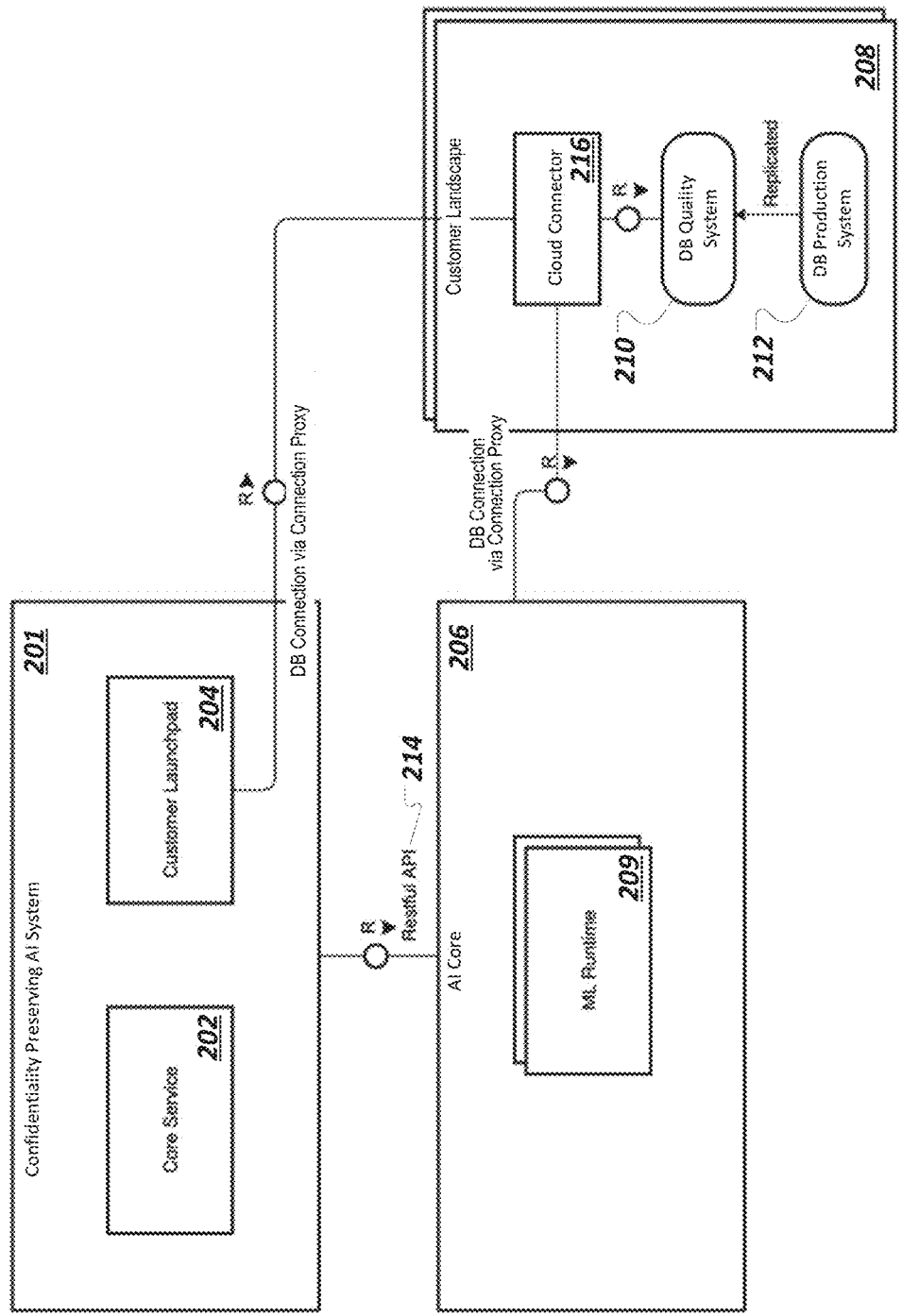
FIG. 2 illustrates an example system for confidentiality-preserving machine learning on ERP or other organizational data.

FIG. 2 illustrates an example system 200 for confidentiality-preserving machine learning on ERP or other organizational data. The system 200 includes a confidentiality-preserving AI system 201, an AI core component 206, and a customer landscape 208. The confidentiality-preserving AI system 201 includes a core service 202 and a customer launchpad service 204.

The core service 202 of the confidentiality-preserving AI system 201 is a distributed application for executing ML projects against remote datasets. For example, the AI system 201 can orchestrate execution of ML pipelines using an ML runtime 209 of the AI core component 206 on datasets in a quality system 210 in the customer landscape 208 that includes data replicated from a production system 212. The core service 202 can call the AI core component 206 using a RESTful (REpresentational State Transfer) API 214 with an authorization token. The AI core component 206 can serve as the ML execution runtime and can connect to the customer landscape 208 using a cloud connector 216. Data replication can occur when an ML pipeline is executed. Accordingly, even as production data continuously changes, the ML pipeline can always run against the latest version of the production data. Data replication can be implemented, for example, by creating virtual views in the quality system 210 that point to actual data in the production system 212. Therefore, anytime such a virtual view is accessed in the quality system 210, it can automatically expose the latest data from the production system 212.

ML pipelines can be executed using data in the quality system 210 without transferring raw customer data to the software system provider, thereby protecting customer data confidentiality. The software provider can receive telemetry data, for example. The customer launchpad service 204 enables customers to configure and administrate connectivity to the quality system 210, configure workload schedules, monitor ML pipelines, and monitor and inspect telemetry data transferred to be transferred to the software provider.

Further details of the customer launchpad service 204 and the core service 202 are described below.

Figure 3:
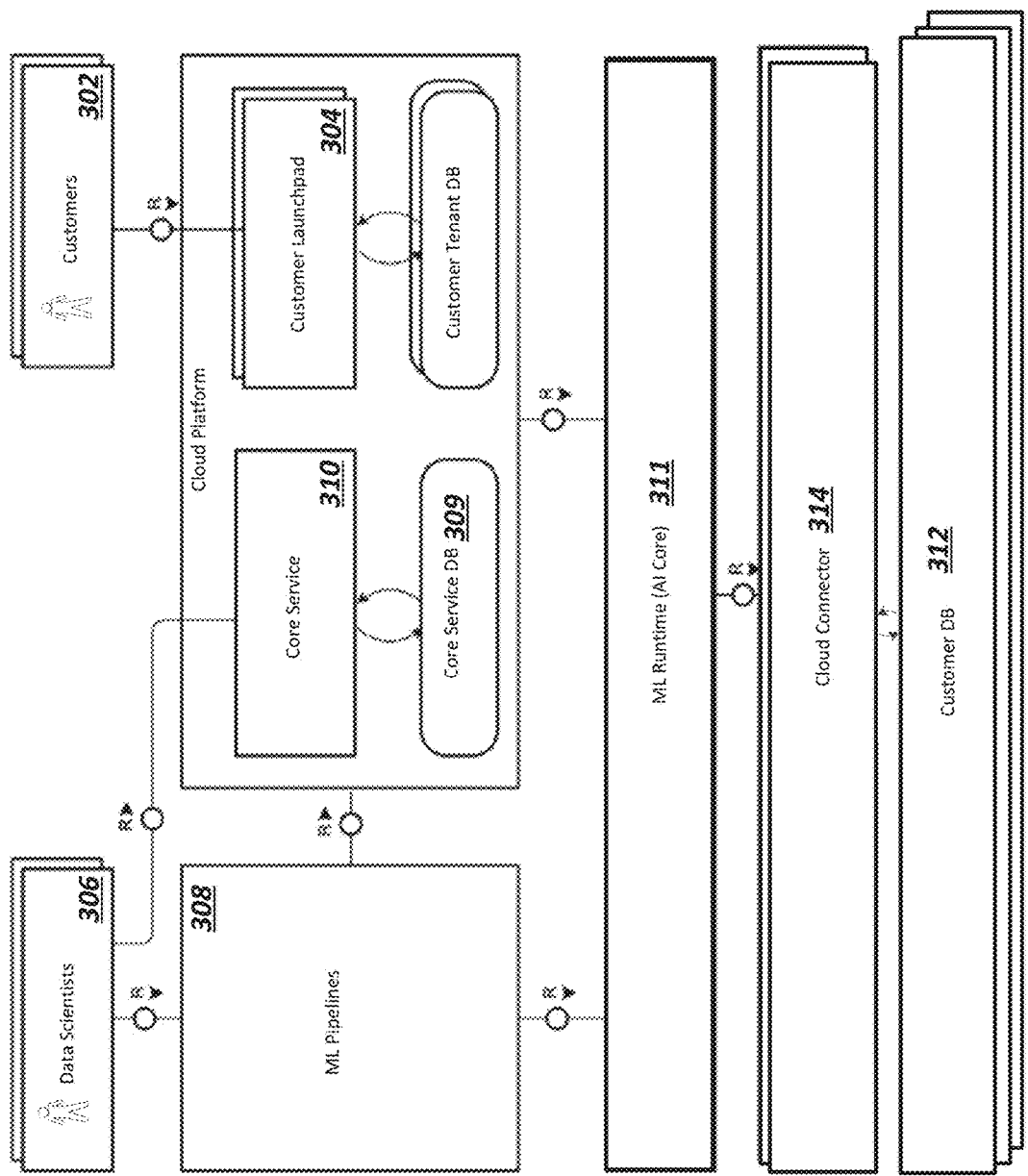
FIG. 3 illustrates an example system for executing machine learning pipelines on remote customer datasets.

FIG. 3 illustrates an example system 300 for executing machine learning pipelines on remote customer datasets. Customer users 302 can perform various configuration and monitoring tasks using a customer launchpad 304. The customer launchpad 304 is described in more detail below with respect to FIG. 4. Data scientists 306 can be included in a class of users who develop and test ML models for new or existing intelligent applications offered by the software provider. Data scientists 306 of the software provider can perform various actions with respect to ML pipelines 308, for example.

For example, a data scientist 306 can create an ML project and add one or more ML pipelines 308 to the ML project. ML project metadata and runtime data can be stored in a core service database 309, for example. The data scientist 306 can build the ML pipelines using different types of technology, such as Python or other code. The data scientist 306 can also configure which ML pipelines 308 can be used for which customer and which ML pipelines can be used for which versions of software provided by the software provider. The data scientist 306 can perform initial training and optimization using an internal validation system internal to the software provider. The data scientist 306 can also trigger validation or further optimization or training of the ML pipelines 308 on customer system(s). The data Scientist 306 can submit, monitor, and potentially interrupt a validation task while it is running on the customer validation systems. The data scientist 306 can view validation results of completed validation runs and can adapt the ML pipelines 308 and initiate additional validation tasks until validation results are satisfactory.

As mentioned, a core service 310 can trigger execution of ML pipelines 308 by using a ML runtime 311 (e.g., included in an AI core component). The ML runtime 311 can provide ML pipeline execution runtime and can connect to a customer database 312 using a cloud connector 314. In some implementations, the system 300 includes multiple databases and multiple cloud connectors. The core service 310 is described below with respect to FIG. 5. ML pipeline execution is described in more detail below with respect to FIGS. 6-9.

Figure 4:
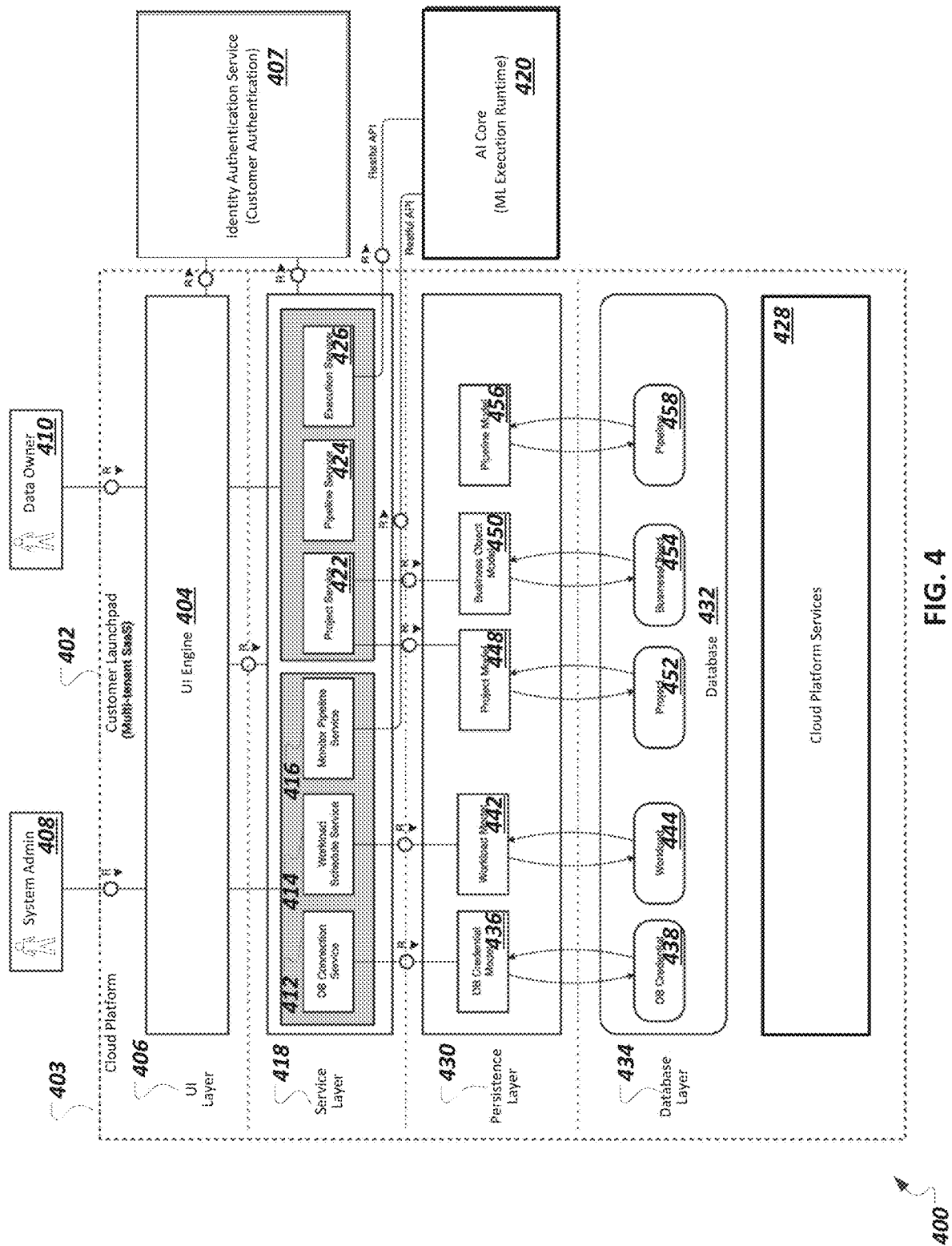
FIG. 4 illustrates an example system that includes a customer launchpad service.

FIG. 4 illustrates an example system 400 that includes a customer launchpad service 402. The customer launchpad service 402, running on a cloud platform 403, enables access to various services for customers for monitoring and configuring a confidentiality-preserving AI system. Customer users can access features of the customer launchpad service 402 using a UI (User Interface) engine 404 of a UI layer 406. Customer users can be authenticated to the customer launchpad service 402 using an identity authentication service 407.

A customer can have different types of personas or user roles, such as a customer system administrator 408 and a customer data owner 410. The customer system administrator 408 can be of a class of users who manage and operate the customer components used for ML pipeline execution on remote datasets. The customer system administrator 408 can use features of a database connection service 412, a workload schedule service 414, and a monitor pipeline service 416 included in a service layer 418 of the customer launchpad service 402.

For example, the customer system administrator 408 can use the database connection service 412 to configure connection information (e.g., including credentials) for connecting to a customer database of the customer. The customer system administrator 408 can also use the database connection service 412 to test the connection to the customer database using the configured connection information. Testing the database connection can include testing that a connection to the customer database can be established using the connection information, testing that a database schema as configured in the connection exists in the customer database, testing that the database user specified in the credentials has access to the database schema as configured in the connection, and verifying that the database user does not have access to any other database schemas other than the schema specified in the connection information. Such checks can be performed to ensure that ML pipeline execution is technically prevented from unintentionally accessing or changing database objects that are out of scope for the ML pipeline. Although such database connection tests checks can be performed upon configuration of the connection information using the database connection service 412, similar (or same) checks can be performed each time a ML pipeline is executed, as described below.

For instance, the connection information can be later used by an AI core component 420 for the particular customer to connect to the customer database when ML pipelines are executed against the customer database, as described in more detail below. The connection information can be stored in the AI core component 420, for example. If connection information is changed, the connection information specified using the database connection service 412 can be synchronized with connection information stored in the AI core component 420.

The customer system administrator 408 can use the workload schedule service 414 to define time periods or time windows during which ML pipeline executions can be performed on the customer database. For example, the customer system administrator 408 might specify time windows during off-peak (e.g., nighttime) hours or other time periods when workload of the customer database is expected to be lower than peak time periods. Other workload scheduling information that can be configured using the workload scheduling service 414 can include a configuration of a maximum number of parallel ML pipeline executions on the customer database.

The customer system administrator 408 can use the monitor pipeline service 416 to monitor pipeline execution. If the customer system administrator 408 observes any issue with the ML pipeline execution or wants to stop ML pipeline execution for any other reason, the customer system administrator 408 can initiate halting of ML pipeline execution using the monitor pipeline service 416. In response to the customer system administrator 408 requesting a halt to execution of an ML pipeline, the monitor pipeline service 416 can send a request to the AI core component 420 for carrying out termination of the ML pipeline execution.

The customer data owner 410 can be of a class of users who own or otherwise manage data of a given process, functional, or application area for which ML operations may be performed. The customer data owner 410 may be, for example, a key user or a process or product owner, with the authority to review and decide on usage of product or process data for the purpose of ML model validation. Although the customer data owner 410 can be described as being a separate type of user from the customer system administrator 408, the customer system administrator 408 can fulfill at least some of the roles of the customer data owner 410, for at least some customers.

The customer data owner 410 can use features of a project service 422, a pipeline service 424, and an execution service 426 included in the service layer 418. The customer data owner 410 can use the project service 422 to view a list of ML projects that specifies, for example, which line of business and what database objects are associated with each ML project. The customer data owner 410 can use the project service 422 to determine which data (e.g., which objects) are processed by the ML project. The customer data owner 410 can select a given project in the project list to view more information about the project, such as a list of ML pipelines that are included in the project.

The customer data owner 410 can use the pipeline service 424 to view information about a selected ML pipeline. The pipeline service 424 can display information about previous runs of the ML pipeline, for example. Each run of the ML pipeline can have execution results. The customer data owner 410 can use the execution service 426 to view execution results for a particular ML pipeline execution run. Execution results can include artifacts produced by ML pipelines, such as debrief data or training statistics. The customer data owner 410 can specify which execution results are shared with the software provider. Execution results are described in more detail below, but execution results shared with the software provider include aggregate information rather than original raw customer data.

The services in the service layer 418 can call or use different standard cloud platform services 428. Services in the service layer 418 can access a corresponding data model in a persistence layer 430 which manages corresponding data objects in a database 432 in a database layer 434. For example, a database credential model 436 and database credential objects 438 correspond to the database connection service 440, a workload model 442 and workload objects 444 correspond to the workload schedule service 414. A project model 448 and an object model 450 (which manage project objects 452 and customer objects 454, respectively) can be used by the project service 422. A pipeline model 456 which manages pipeline objects 458 can be used by the pipeline service 424, for example.

Figure 5:
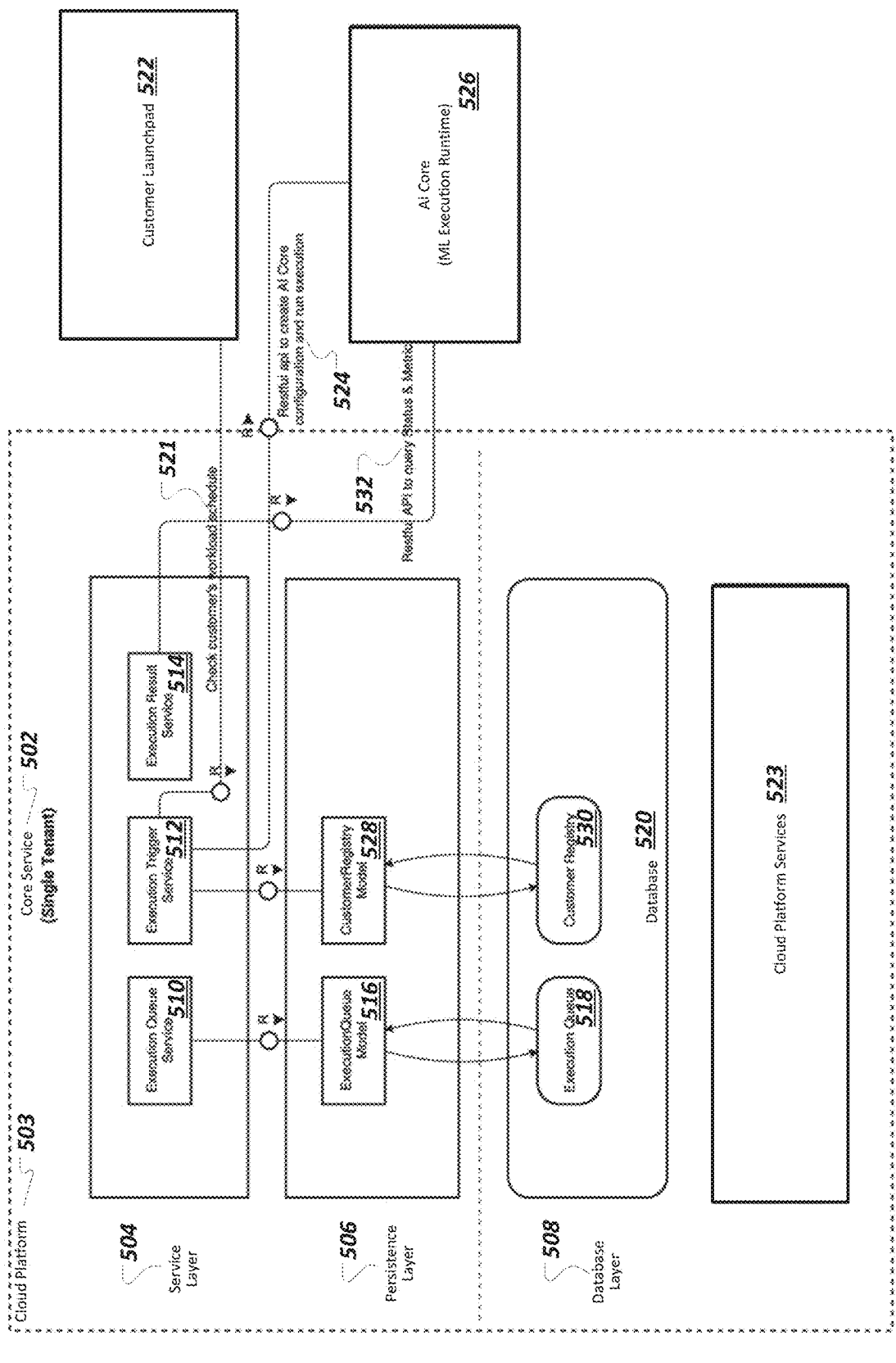
FIG. 5 illustrates an example system that includes a core service.

FIG. 5 illustrates an example system 500 that includes a core service 502. The core service 502 can run on a cloud platform 503 and can include a service layer 504 and a persistence layer 506 that interfaces with a database layer 508 of the cloud platform 503. The service layer 504 includes an execution queue service 510, an execution trigger service 512, and an execution result service 514.

The execution queue service 510 can interact with an execution queue model 516 that represents an execution queue 518 in a database 520. The execution queue 518 can store machine learning pipeline information for machine learning pipelines to be executed on the customer database. The execution queue service 510 can provide an API for adding ML pipelines to the execution queue 518.

The execution trigger service 512 can trigger executions of ML pipelines that are in the execution queue 518, according to a customer's workload schedule. For example, the execution trigger service 512 can obtain workload schedule information for a customer using an API 521 of a customer launchpad service 522 (e.g., the customer launchpad service 522 can be the customer launchpad service 402 describe above with respect to FIG. 4). The execution trigger service 512 can run periodically (e.g., every five minutes) by leveraging, for example job scheduling services included in cloud platform services 523. If during a current run of the execution trigger service 512 the execution queue 518 includes at least one ML pipeline and if the current time is within a time window allowed by the customer workload schedule, the execution trigger service 512 can obtain ML pipeline information from the execution queue 518 and then call an API 524 of an AI core component 526 to trigger execution of the ML pipeline using the AI core component 526 as the ML execution runtime for the ML pipeline. The execution trigger service 512 can obtain appropriate customer connection information using a customer registry model 528 by interfacing with a customer registry 530 in the persistence layer 506. For example, the customer registry model 528 can include mapping information that the execution trigger service 512 can use to retrieve the correct customer connection information. The customer registry model 528 can include a mapping from natural names (e.g., the name of a customer) to technical names (e.g., a technical identifier that corresponds to the customer's tenant of the confidentiality-preserving AI system). Such a mapping approach can be used, for example, so that a data scientist can specify customer systems to execute ML pipelines using natural names rather than technical IDs.

The execution result service 514 can provide an API to obtain ML pipeline execution status. The execution result service 514 can obtain execution result status from the AI core component 526 using an API 532 provided by the AI core component 526. The execution results can include aggregated metrics that are computed as part of running the ML pipeline. Execution results are described in more detail below.

Figure 6:
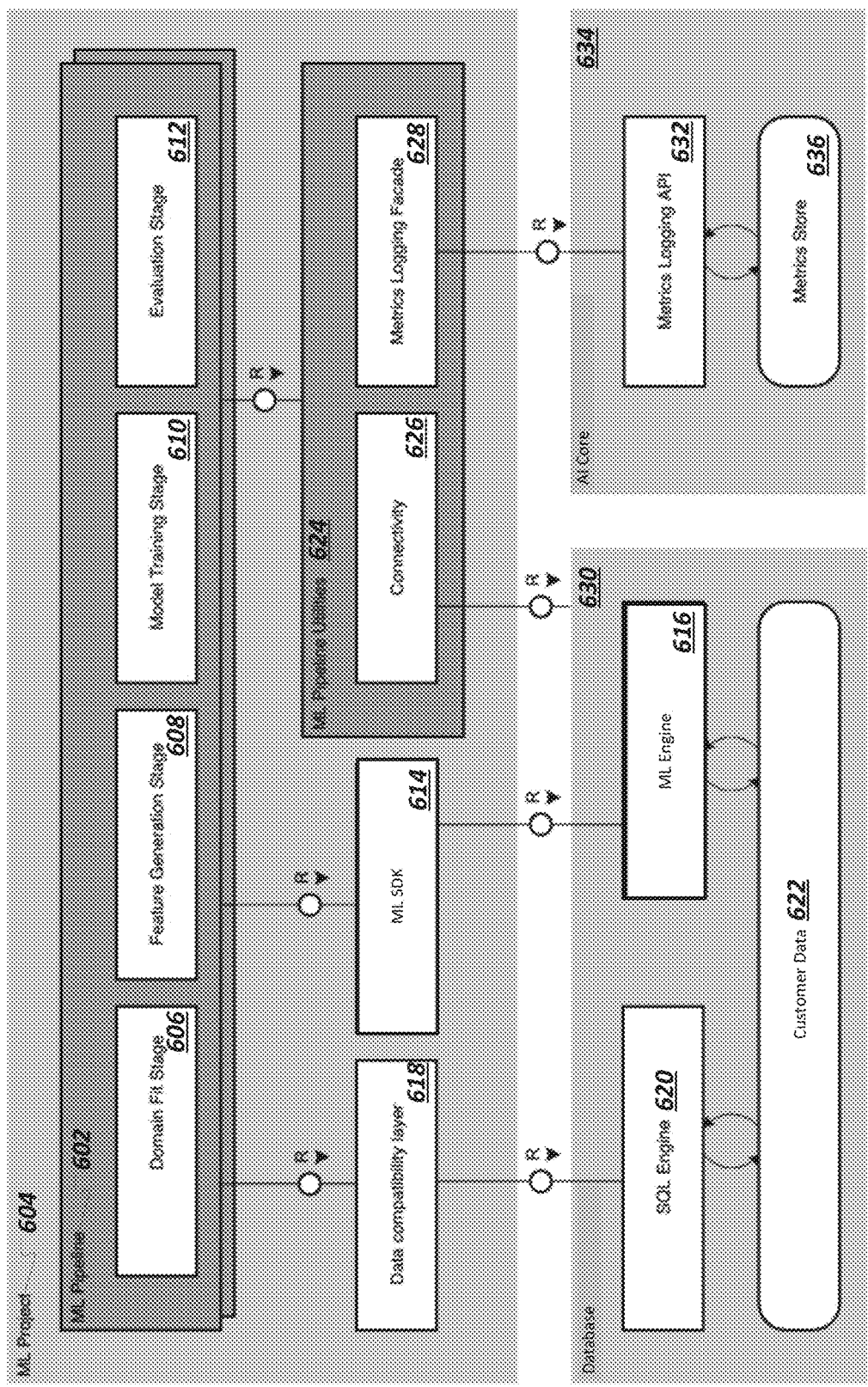
FIG. 6 illustrates a system for a machine learning project runtime architecture.

FIG. 6 illustrates a system 600 for a machine learning project runtime architecture. The system 600 illustrates runtime components for executing ML pipelines 602 of an ML project 604. Execution of an ML pipeline 602 can include a domain fit stage 606, a feature generation stage 608, a model training stage 610, and an evaluation stage 612.

The domain fit stage 606 can be specific to the use case of the ML pipeline 602. The domain fit stage 606 can include determining whether data available to the ML pipeline 602 is of sufficient quality and quantity for performing a run of the ML pipeline 602. That is, the domain fit stage 606 can include processing which checks to determine whether data of the system against which the ML pipeline 602 runs is actually a sufficient fit for the use case of the ML pipeline 602. Actual customer data for a given customer can vary over time, for example. A given customer may only have a few documents or data entries of a particular type that are to be processed by the ML pipeline 602, and the ML pipeline 602 may need a certain number of data items for a successful run, for instance. As an example, the domain fit stage 606 for a ML pipeline related to finance can determine whether customer data includes at least a certain minimum number of receivables in a certain fiscal year, as a decision for whether further execution of the ML pipeline 602 can continue. If the checks of the domain fit stage 606 pass, the feature generation stage 608 can be performed. If a check of the domain fit stage 606 fails, execution of the ML pipeline 602 can be halted.

The feature generation stage 608 can also be use case specific for a given ML pipeline 602. The feature generation stage 608 can include execution of instructions to create intermediate data representations, complex engineered features from customer data, and a final training data table that includes features for the ML pipeline 602 and a target variable to be predicted. The model training stage 610 includes model training, including training of models on data partitions. The model training stage 610 is described in more detail below with respect to FIG. 7. The evaluation stage 612 includes evaluation of trained models. The evaluation stage 612 is described in more detail below with respect to FIG. 8.

Different stages of the ML pipeline 602 can leverage a ML SDK (Software Development Kit) 614 which uses an ML engine 616. A data compatibility layer 618 can provide to the runtime components of the ML pipeline 602 a set of views that are independent of a software provider system and version. The data compatibility layer 618 can transform a data model of the software provider system into a common format (e.g., from one provided by an SQL engine 620 of a particular database version 622) so that a data model exposed to the ML pipeline runtime components is independent of the software provider system and version. The data compatibility layer 618 can determine a particular software provider and version during execution of a ML pipeline 602 and select an appropriate transformation model for transforming the data model of the software provider system into the common format.

ML pipeline runtime components can use different ML pipeline utilities 624 such as connectivity utilities 626, a metrics logging facade 628, or other utilities. The connectivity utilities 626 component enables an ML pipeline 602 to read (e.g., from environment variables) database logon credentials for connecting to a customer database 630. The metrics logging facade 628 enables ML pipelines to log metrics when running locally (e.g., at the software provider), by interfacing with a metrics logging API 632 of an AI core component 634. Metrics can be stored in a metrics store 636.

Figure 7:
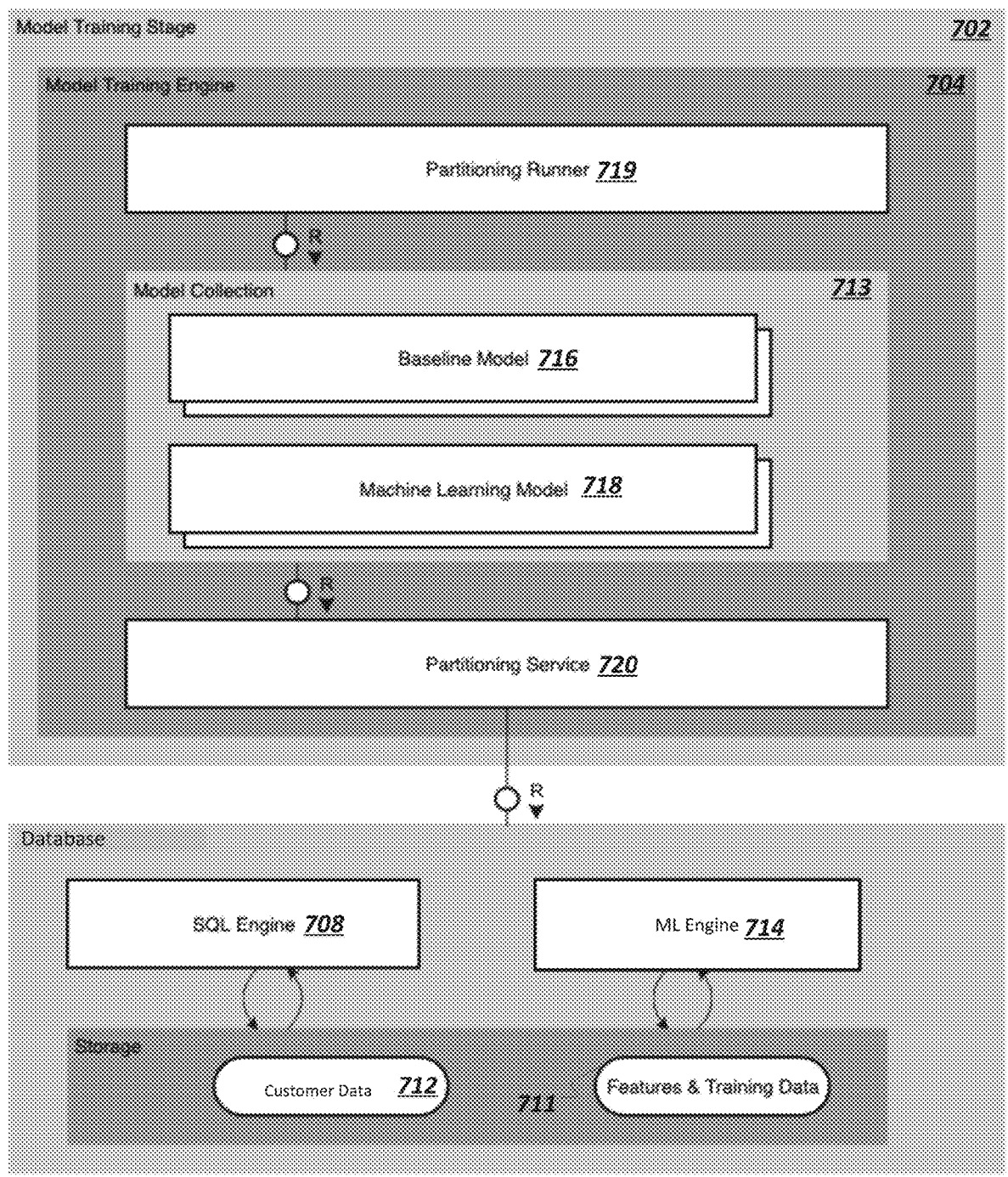
FIG. 7 illustrates an example system for a model training stage.

FIG. 7 illustrates an example system 700 for a model training stage 702. A model training engine 704 can perform various tasks, in the model training stage 702, for each model being trained.

Model training can involve partitioning customer data. Customer data may be substantially different with respect to one or more partitioning variables. For example, for a given customer, customer data of the customer may substantially differ between company codes (that represent different sub-entities of the customer), countries, regions, currency type, or other variables. When customer data differs substantially across one or more of these variables, training a model on a full customer data set may not result in an acceptable model. More accurate models can be obtained by training data on data partitions that have been created by partitioning data using a partitioning variable.

The model training engine 704 can process a training data table (e.g., included in features and training data 711. The features and training data 711 can be data that has been generated from customer data 712 during the feature generation stage 608, for example. The model training engine 704 can process the training data table to produce different types of models, e.g., as shown in a model collection 713. For example, the model training engine 704 can use a ML engine 714 to generate one or more baseline models 716 and one or more ML models 718.

Baseline models 716 can mimic actions a skilled clerk may perform. For example, baseline models 716 can calculate a value for a target variable based on a subset of features available in the training data table in the features and training data 711. The ML models 718, in contrast, can calculate a value for the target variable based on all features available in the training data table.

As mentioned, the models in the model collection 713 can be trained for a particular data partition. That is, the model training engine 704 can train one or more baseline models 716 and one or more ML models 718 for every partition. The model training engine 704 can iterate over all partitions of one or more partitioning variables using a partitioning runner 719. The model training engine 704 can obtain data for a particular partition to use in training from a partitioning service 720.

Figure 8:
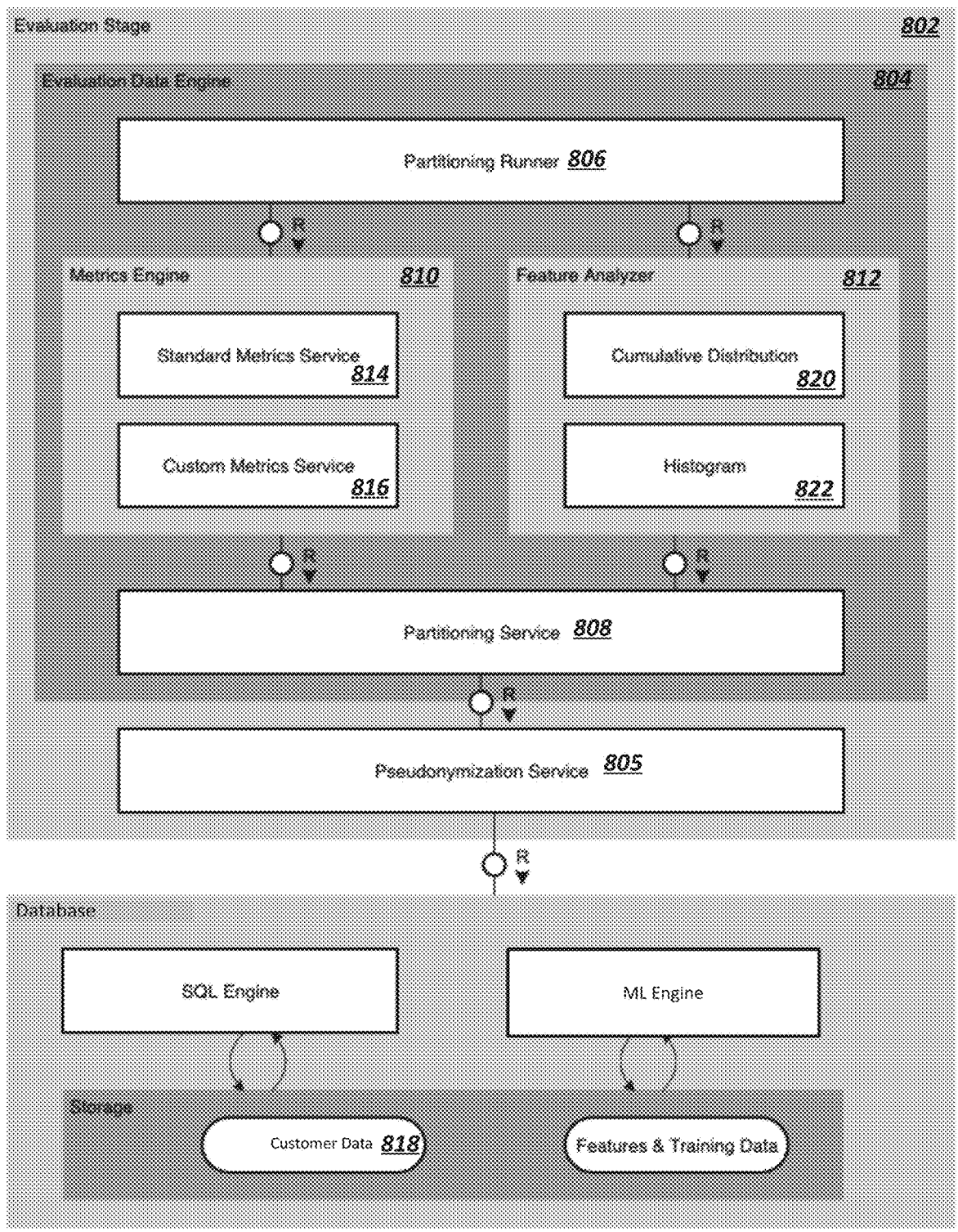
FIG. 8 illustrates an example system for an evaluation stage.

FIG. 8 illustrates an example system 800 for an evaluation stage 802. The evaluation stage 802 can involve computation of evaluation data that both protects the confidentiality of the customer's data and also informs data scientists of the software provider on accuracy and behavior of models.

An evaluation data engine 804 can generate evaluation data for each model. Evaluation data can be computed by the evaluation data engine 804 after "pseudonymization" (e.g., standardization and/or tokenization) is applied by a pseudonymization service 805 to individual customer data records in order to protect data confidentiality. For example, numeric data can be standardized to a normal distribution with a mean of zero and a standard deviation of one and categorical data can be tokenized.

As mentioned, models can be trained with respect to partitions. The evaluation data engine 804 can evaluate models according to partitions by using a partitioning runner 806 and a partitioning service 808. For example, data partitions can be provided to a metrics engine 810 and a feature analyzer 812.

The metrics engine 810 can compute model debrief data. Model debrief data can be computed for trained models including baseline and ML models. The model debrief data for a model can include metrics that are computed and tracked during ML pipeline execution to assess the model's performance. Standard metrics can be computed by a standard metrics service 814 that reflect, for example, accuracy, mean absolute error, confusion matrix, or SHAP (Shapely) values for the model. Other (e.g., non-standard) metrics can be computed by a custom metrics service 816 that include, for example, measurements of the model's performance expressed in key performance indicators (KPIs), such as savings potential or additional revenue estimation. Custom metrics which are specific to a particular machine learning pipeline can be defined by an engineer, data scientist, or software developer of the software provider. As an example, a day sales outstanding metric can be computed as custom metric for a finance-related ML pipeline. As mentioned, metrics computed by the metrics engine 810 are not just computed for the entire dataset, but also for partitions, so that a data scientist can better understand how well a model worked even when customer data is heterogeneous across partitions.

The feature analyzer 812 can compute company data statistics for a customer. The feature analyzer 812 can computer company data statistics by filtering and grouping customer data 818 by partitioning variables. Company data statistics can include a number of rows of the customer data underlying the ML model for every data partition. Further, the feature analyzer 812 can analyze any field in the customer data 818 or the features and training data, including the target field (e.g., the field to be predicted by the ML model). For numeric fields and a given partition, the feature analyzer 812 can compute cumulative distributions 820 and for categorical fields and a given partition, the feature analyzer 812 can compute histograms 822.

Figure 9:
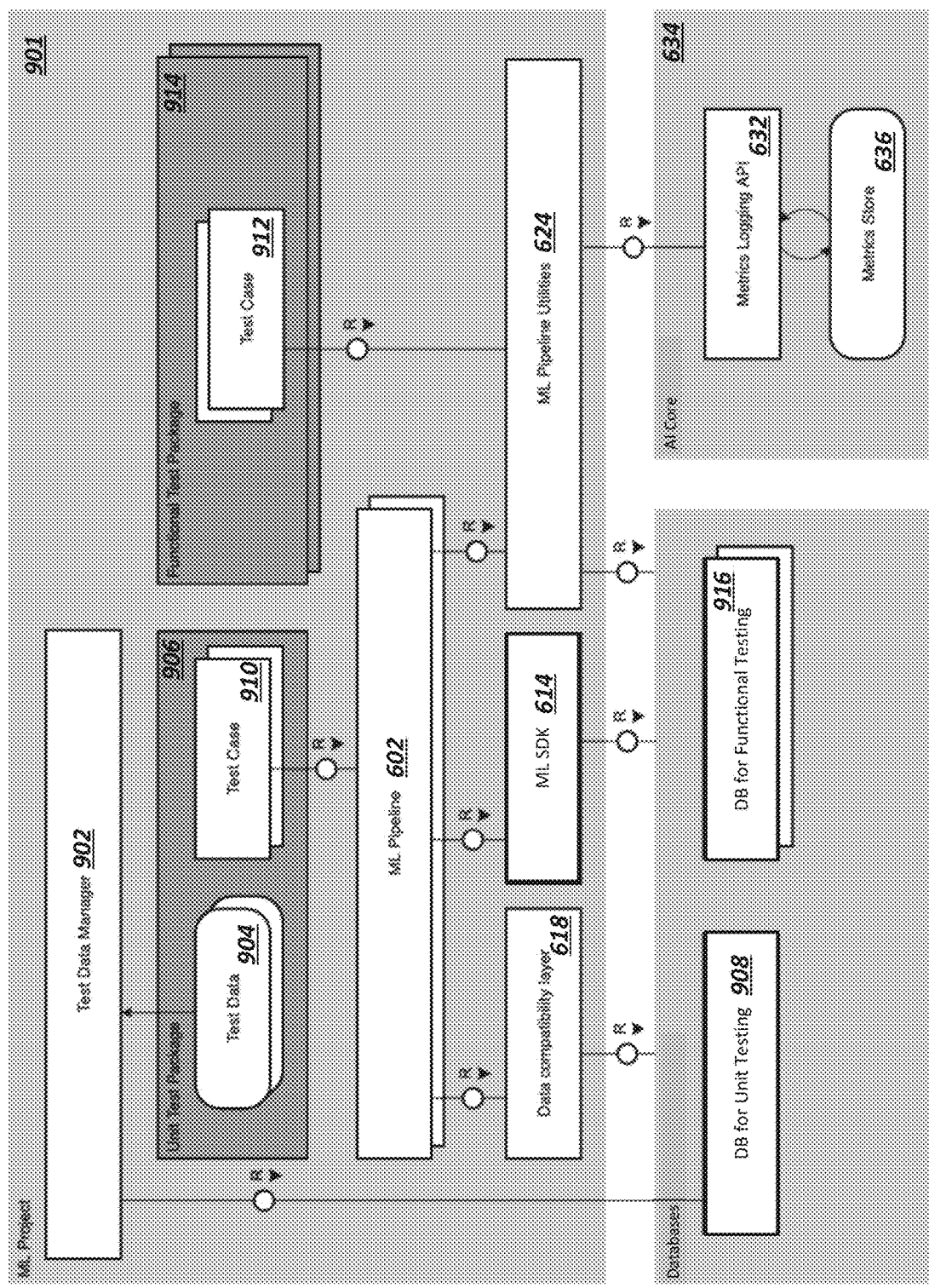
FIG. 9 illustrates an example system for testing of machine learning projects.

FIG. 9 illustrates an example system 900 for testing of machine learning projects. The system 900 is based on the system 600 described above with respect to FIG. 6 but shows additional components related to ML project testing for an ML project 901. For example a test data manager 902 can read test data 904 from a unit test package 906 that is associated with an ML pipeline 602. The test data 904 can include a curated set of data for the entire set of database tables and fields processed by the ML pipeline 602. The ML pipeline 602 includes, for example, database query instructions. Accordingly, tests performed for the ML pipeline can be performed in a database. The test data manager 902, for example, can push the test data 904 to a database 908 for unit testing. Unit test cases 910 included in the unit test package 906 can be run against the database 908 for unit testing. Execution of the unit test cases 910 can include execution of code against the ML pipeline 602 that uses a known test data set from the test data 904 and determining whether an actual outcome is an expected outcome.

Functional test cases 912 included in a functional test package 914 can also be run against the ML pipeline 602, using data in a database 916 for functional testing. Functional testing of the ML project 901 can include steps of asserting the correct function of the ML project 901 with respect to trained baseline and machine learning models (e.g., the baseline models 716 and the ML models 718, respectively). ML-specific function testing can be performed using known data sets. For example, the functional test cases 912 can include code that includes assertion conditions on the metrics generated by a particular ML pipeline 602 run against a configured dataset. The code of a functional test case 912 can obtain and read the metrics produced by an ML pipeline run of the ML pipeline 602 from the metrics store 636 and compare the obtained metrics with expected values.

Functional testing is described in more detail below. For example, functional testing as well as unit testing can be included in an overall build process for the ML project 901, as described below with respect to FIG. 10.

Figure 10:
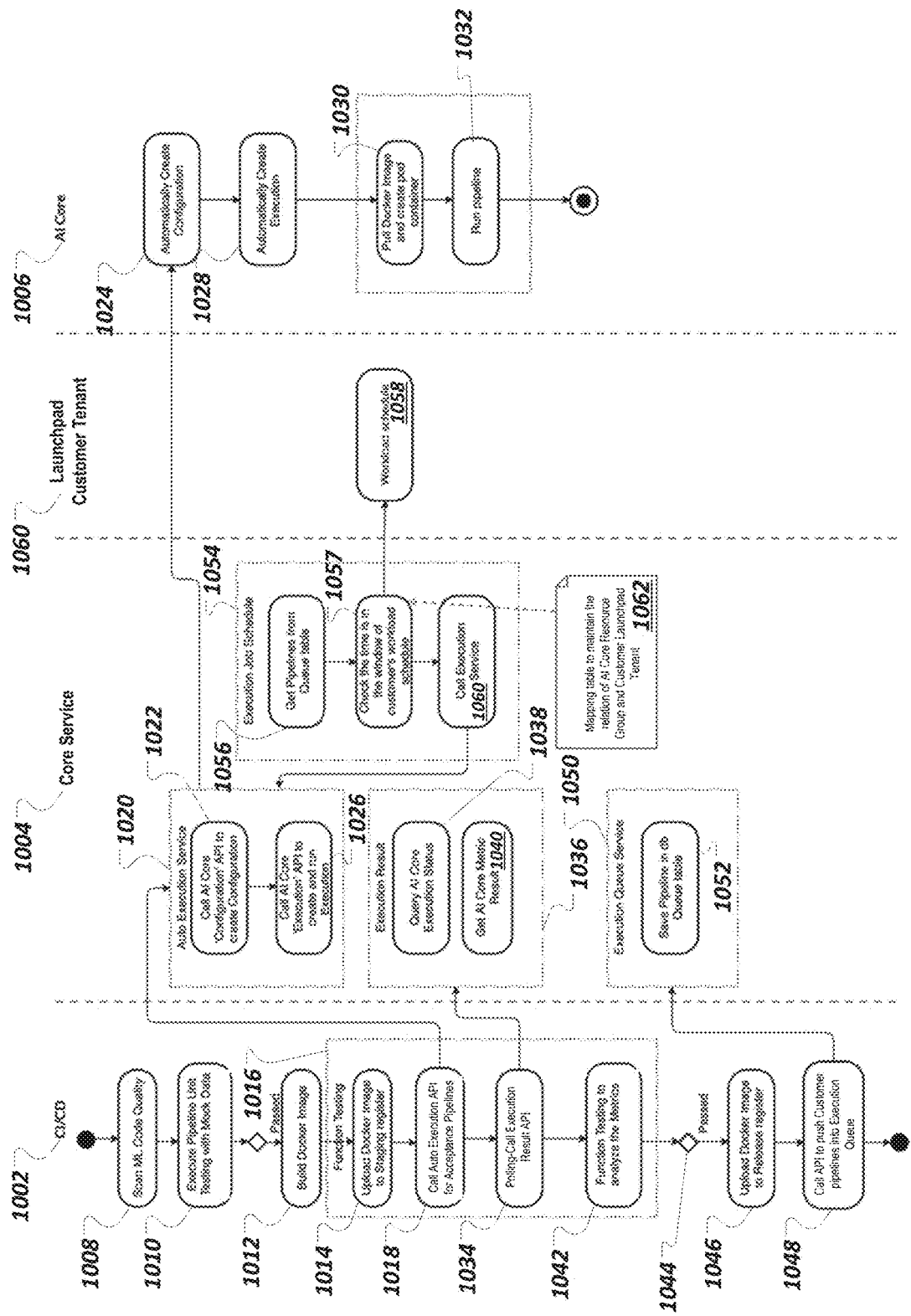
FIG. 10 illustrates a build and runtime process for machine learning projects.

FIG. 10 illustrates a build and runtime process 1000 for machine learning projects. In summary, the process 1000 includes automatically building ML pipelines into an executable (e.g., Docker) image and deployment through a CI (Continuous Integration)/CD (Continuous Delivery) pipeline 1002 with a customized script that calls a core service 1004 to trigger pipeline execution in an AI core service 1006. The process 1000 is for automatically triggering an ML pipeline execution after a data scientist at the software provider has completed code of the ML pipeline, for example. ML pipelines can be automatically and iteratively executed, for example, as part of an efficient, accurate, and robust ML validation and optimization process.

In further detail, the CI/CD pipeline 1002 can be a custom CI/CD pipeline that is used to build and deploy ML projects. At 1008, ML code is scanned to determine whether any quality or security issues are detected. At 1010, if ML code quality is sufficient, pipeline unit testing is performed using mock data (e.g., as described above with respect to FIG. 9). At 1012, if unit testing passes, an executable (e.g., Docker) image is built for the ML pipeline.

The ML pipeline code can be organized into different cells or snippets of code, where each cell may have a different set of code. For example, machine learning software development may differ from that of classic software development, as ML development is generally more experimental and interactive. During development, data scientists often create code snippets which are primarily for experimental purposes, and other snippets, which contain already mature code. The CI/CD pipeline 1002 can support a data scientist labeling those parts of the ML pipeline that are already of a maturity for automatically running them on a customer system, while skipping other experimental code. As another example, experimental code, or code to skip, may be labeled, or both mature code and experimental code may be labeled with different labels. When building the executable image, a cell remover can identify cells that include code that is not to be included in the image, so that to-be-removed code is removed before the image is built.

At 1014, after the executable image is built, the image is uploaded to a staging registry, in preparation for functional testing operations 1016. The functional testing operations 1016 can be used for fully-automated testing of ML models. In summary, the functional testing operations 1016 involve training models on known data and then testing to see if accuracy of the trained models (and other metrics of interest, e.g., to a data scientist) are within range of an accuracy that is expected to be produced given the known data.

At 1018, an automatic execution service 1020 of the core service 1004 is called for one or more acceptance pipelines to run against known datasets. The automatic execution service 1020 can be or be a part of the execution trigger service 512, for example.

At 1022, for a given acceptance pipeline, the automatic execution service 1020 sends a request to a configuration API of the AI core service 1006 to create a configuration for the acceptance pipeline. At 1024, the AI core service 1006 automatically creates a configuration for the acceptance pipeline. At 1026, the automatic execution service 1020 sends a request to an execution API of the AI core service 1006 to create and run an execution for the acceptance pipeline. At 1028, the AI core service 1006 automatically creates an execution. At 1030, the AI core service 1006 pulls an executable image (e.g., from the staging registry) and creates a pod container. At 1032, the AI core service runs the acceptance pipeline using the pod container.

At 1034, after calling the automatic execution service 1020, the CI/CD pipeline 1002 performs polling operations by calling an execution result API of an execution result service 1036. The execution result service 1036 can be the execution result service 514, for example. At 1038, the execution result service 1036 queries the AI core service 1006 for execution status. At 1040, if the AI core service 1006 informs the execution result service 1036 that execution of the acceptance pipeline has completed, the execution results service 1036 can receive metric results from the AI core service 1006. The execution result service 1036 can provide the metric results for the acceptance pipeline to the CI/CD pipeline 1002.

At 1042, the CI/CD pipeline 1002 can perform function testing for the acceptance pipeline by analyzing the metrics. For example, a functional test package can be executed. The functional test package can include code that compares accuracy metrics in the metrics received from the execution result service 1036 to an expected accuracy configured for the acceptance pipeline. If the accuracy metrics received from the execution result service 1036 for the acceptance pipeline are within a threshold range of the expected accuracy, the CI/CD pipeline 1002 can determine that the acceptance test passes for the acceptance pipeline. If the accuracy metrics received from the execution result service 1036 for the acceptance pipeline are not within a threshold range of the expected accuracy, the CI/CD pipeline 1002 can determine that the acceptance test fails for the acceptance pipeline. If an acceptance test fails, the function testing for the ML pipeline can fail, and further deployment can be halted and appropriate communications can be made to inform the data scientist about the failure. Data scientists generally make incremental changes to models, so determining that an accuracy from a modified model is within a threshold range of an expected accuracy can be a sufficient test to detect regression errors, since a valid incremental change to a model will generally have an incremental effect on accuracy. If, however, the data scientist makes an unintended change to a model that may invalidate a substantial portion of the model, an accuracy produced by such a model may likely be substantially different from an expected accuracy. Accordingly, function testing for the invalid model can detect that something is wrong with the model.

If there are multiple functional test cases for the ML pipeline, each functional test case can be triggered and evaluated by the CI/CD pipeline 1002. As mentioned, if any given acceptance test fails, function testing can fail for the ML pipeline as a whole. At 1044, a determination is made that all acceptance tests have passed for the ML pipeline. If the ML pipeline is included in a ML project that includes multiple ML pipelines, acceptance testing can be performed for each ML pipeline. At 1046, the executable image for the ML pipeline is uploaded to a release registry.

At 1048, the CI/CD pipeline 1002 calls an API of an execution queue service 1050 to push the ML pipeline into an execution queue. The execution queue service 1050 can be the execution queue service 510, for example. At 1052, the execution queue service 1050 adds the ML pipeline to the execution queue to await execution against customer data.

An execution job schedule service 1054 can process ML pipelines in the execution queue to determine whether to trigger execution of the ML pipeline on customer data. The execution job schedule service 1054 can be or be a part of the execution trigger service 512, for example. At 1056, the execution job schedule service 1054 retrieves a ML pipeline from the execution queue. At 1057, the execution job schedule service 1054 determines if the current time is within an allowable time window of the customer's workload schedule. The execution job schedule service 1054 can obtain a workload schedule 1058 for the customer from a customer launchpad service 1060 by using a mapping 1062. If the current time is within an allowable time window of the workload schedule 1058, the execution job schedule service 1054 can call the automatic execution service 1020 for the ML pipeline. The automatic execution service 1020 can trigger execution of the ML pipeline by the AI core service in a similar fashion as described above for acceptance pipelines, with the ML pipeline executions now being performed on customer data rather than acceptance data. Execution results for the ML pipeline execution can be obtained by the execution result service 1036, as described above. If the customer has agreed to share results with the software provider, execution results can be shared, for example, with data scientists of the software provider.

Before an ML pipeline (or an acceptance pipeline) is executed, the AI core service 1006 can perform a pre-check and execute the pipeline only if the pre-check passes. For example, building the Docker image (e.g., at step 1012) can include including functionality in the Docker image to implement pre-check conditions. The AI core service 1006 can execute the Docker image with the pre-check conditions. The configuration created at step 1024 can instruct the AI core service 1006 to first run pre-checks, and only if the pre-check is successful, run the actual ML pipeline. The pre-checks can include: testing that a connection to the customer database can be established based on the credentials stored in the AI core service 1006, testing that a database schema in a configured database connection actually exists in the customer database, testing that a configured database user actually has access to the database schema as configured in the database connection, and testing that the database user has no access to any other database schemas.

Figure 11A:
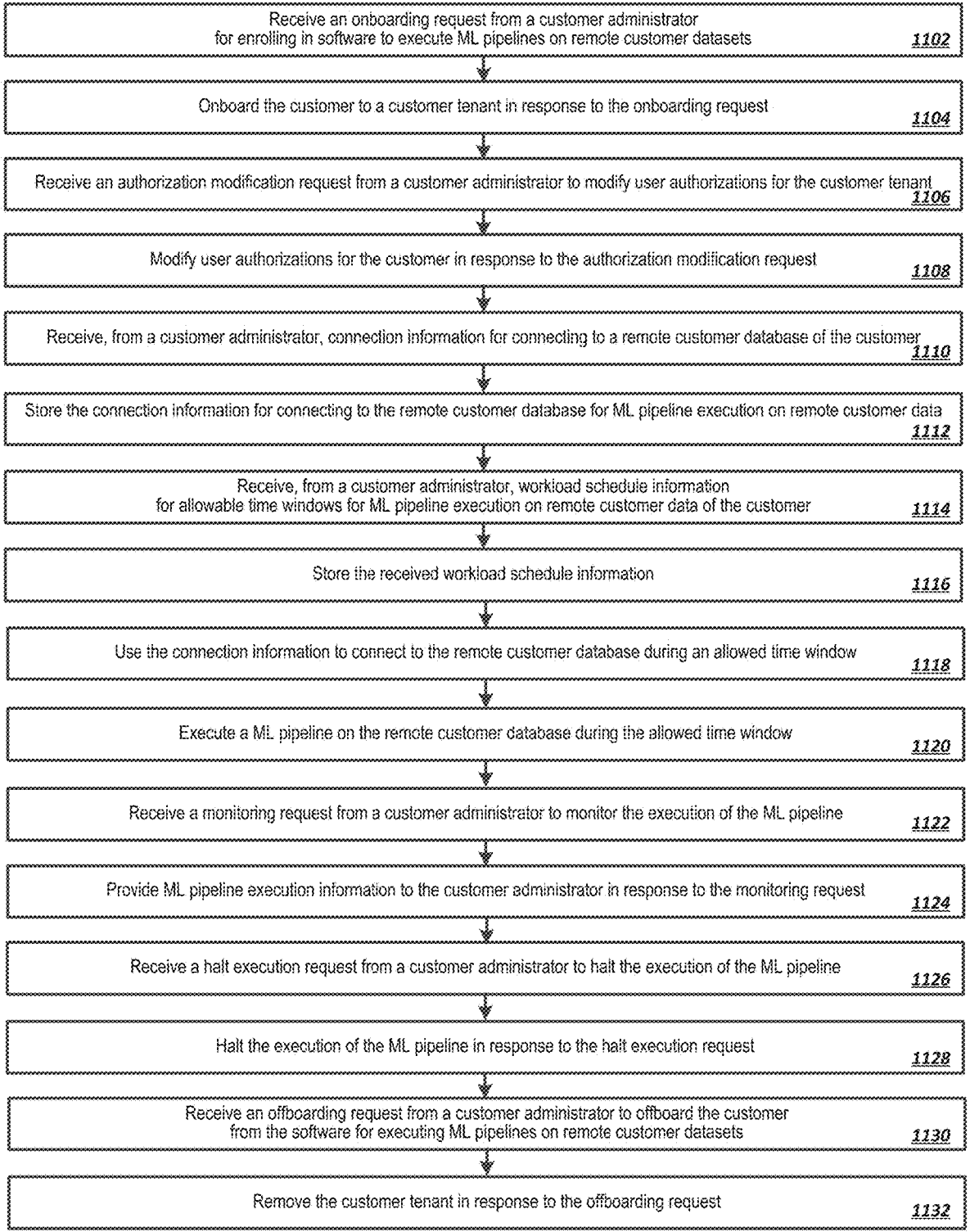
FIGS. 11A and 11B are flowcharts of example processes.

FIG. 11A is a flowchart of an example process 1100. The process 1100 illustrates example processing relating to customer administrator requests.

At 1102, an onboarding request is received from a customer administrator for enrolling in software to execute ML pipelines on remote customer datasets.

At 1104, the customer is onboarded to a customer tenant of the software in response to the onboarding request.

At 1106, an authorization modification request is received from a customer administrator to modify user authorizations for the customer tenant.

At 1108, user authorizations are modified for the customer in response to the authorization modification request.

At 1110, connection information for connecting to a remote customer database of the customer is received from a customer administrator of the customer.

At 1112, the connection information is stored for connecting to the remote customer database for ML pipeline execution on remote customer data At 1114, workload schedule information is receiving, from a customer administrator, that defines allowable time windows for ML pipeline execution on remote customer data of the customer.

At 1116, the received workload schedule information is stored in the customer tenant.

At 1118, the connection information is used to connect to the remote customer database during an allowed time window.

At 1120, a ML pipeline is executed on the remote customer database.

At 1122, a monitoring request is received from a customer administrator to monitor the execution of the ML pipeline.

At 1124, ML pipeline execution information is provided to the customer administrator in response to the monitoring request.

At 1126, a halt execution request is received from a customer administrator to halt the execution of the ML pipeline.

At 1128, the execution of the ML pipeline is halted in response to the halt execution request.

At 1130, an offboarding request is received from a customer administrator to offboard the customer from the software for executing ML pipelines on remote customer datasets.

At 1132, the customer tenant is removed in response to the offboarding request.

Figure 11B:
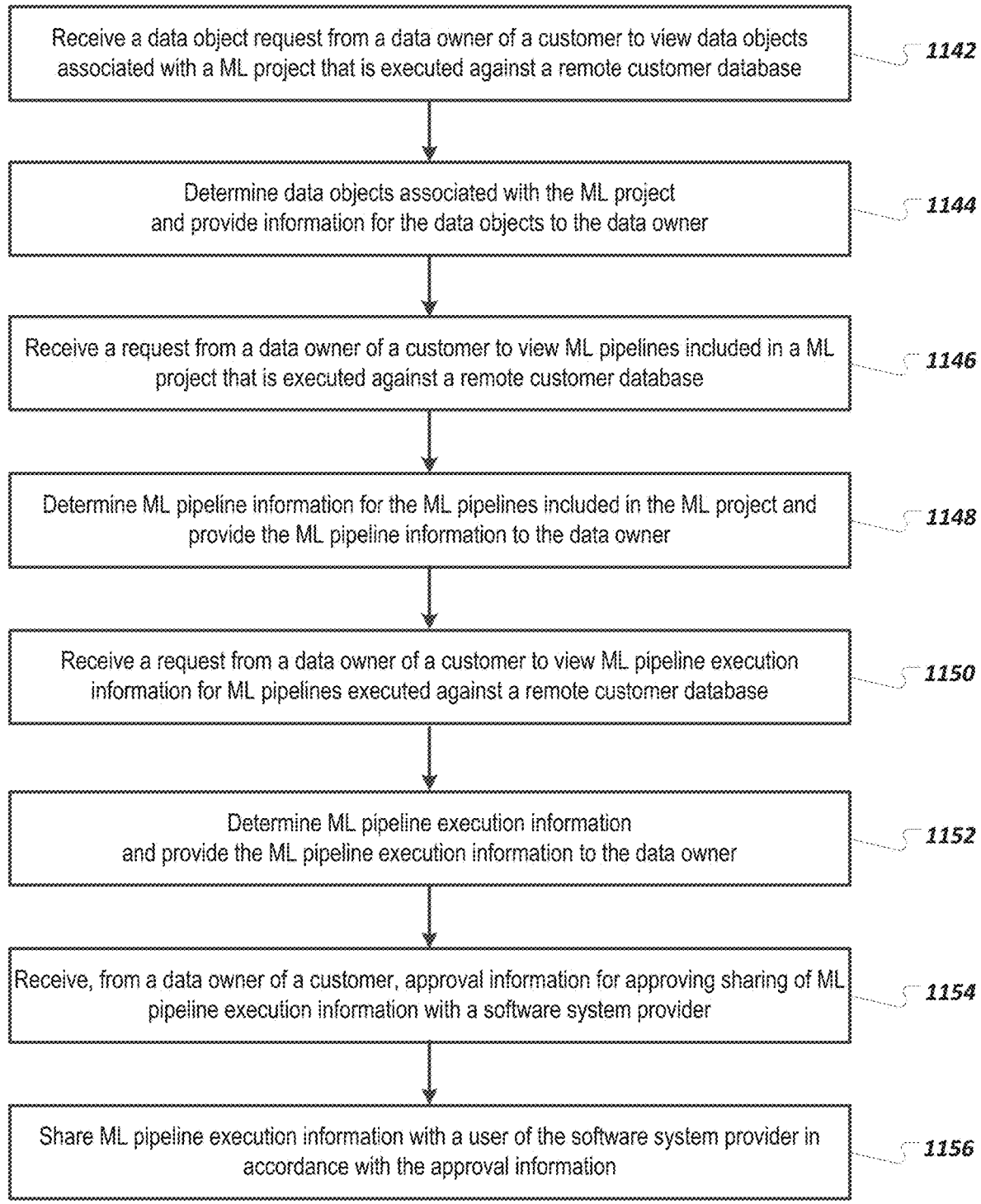

FIG. 11B is a flowchart of an example process 1140. The example process 1140 includes example processing related to requests received from a data owner of a customer.

At 1142, a data object request is received from a data owner of a customer to view data objects associated with a ML project that is executed against a remote customer database.

At 1144, data objects associated with the ML project are determined and information for the data objects to the data owner in response to the data object request.

At 1146, a ML pipeline information request is received from a data owner of a customer to view ML pipelines included in a ML project that is executed against a remote customer database.

At 1148, ML pipeline information is determined for the ML pipelines included in the ML project and the ML pipeline information is provided to the data owner in response to the ML pipeline information request.

At 1150, a ML pipeline execution information request from a data owner of a customer to view ML pipeline execution information for ML pipelines executed against a remote customer database.

At 1152, ML pipeline execution information is determined and the ML pipeline execution information to the data owner in response to the ML pipeline execution information request.

At 1154, approval information is received from a data owner of a customer for approving sharing of ML pipeline execution information with a software system provider.

At 1156, ML pipeline execution information is shared with a user of the software system provider in accordance with the approval information.

Figure 11C:
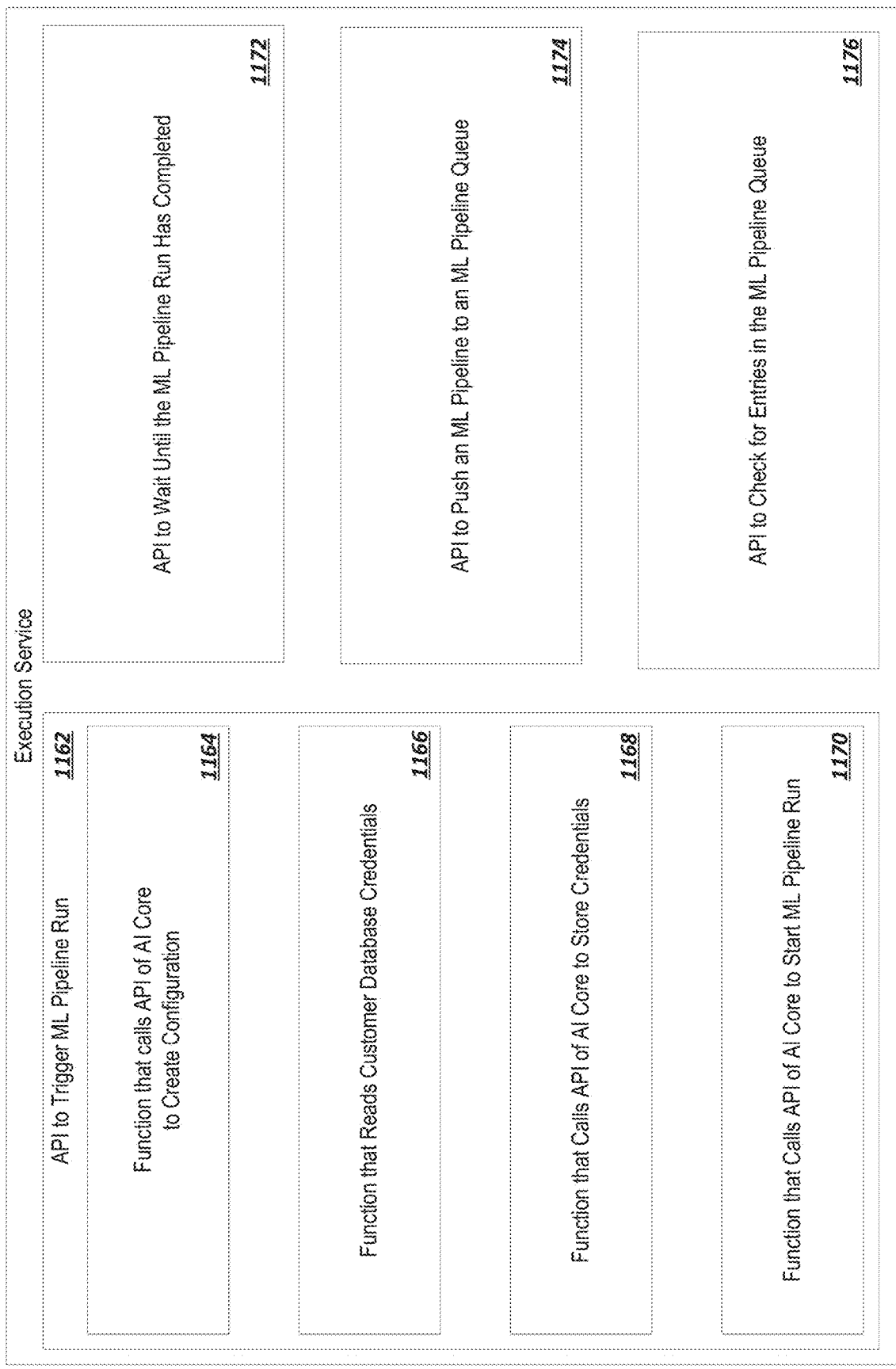
FIG. 11C illustrates an example execution service for machine learning pipelines.

FIG. 11C illustrates an example execution service 1160 for machine learning pipelines. The execution service 1160 includes, for example, software functions that enable a developer at a software provider to run ML pipelines on customer data.

The execution service 1160 includes an API 1162 to trigger a ML pipeline run. The API 1162 includes a function 1164 that calls an API of an AI core component to create a configuration in order to run the ML pipeline. The API 1162 also includes a function 1166 that reads customer database credentials from a credential store. The API 1162 also includes a function 1168 that calls an API of the AI core component to store the customer database credentials securely in the AI core component.

The API 1162 includes a function 1170 that calls an API of the AI core component to start the ML pipeline run. Starting the ML pipeline run results in the AI core component executing a pre-check and based on the configuration, executing the ML pipeline only if the pre-check is successful. The pre-check includes the following steps: (i) testing that a connection to the customer database can be established, based on the credentials stored in the AI core component, (ii) testing that the database schema as configured in the database connection exists, (iii) testing that the database user has access to the database schema as configured in the database connection, and (iv) testing that the database user has no access to any other database schema.

The execution service 1160 includes an API 1172 to wait until the ML pipeline run has completed. The API includes a function that calls an API of the AI core component to retrieve the ML pipeline status. The execution service 1160 includes an API 1174 to push an ML pipeline to the ML pipeline queue and an API 1176 to check for entries in the ML pipeline queue table. The API 1176 can be regularly triggered using a job scheduler service of the cloud platform. The API 1176 includes a function that can check, for any entry in the ML pipeline queue table, if the current time is within the customer's workload schedule. The API 1176 includes a function that triggers the ML pipeline run if the current time is within the customer's workload schedule and a function that removes the entry from the ML pipeline queue table.

Figure 12A:
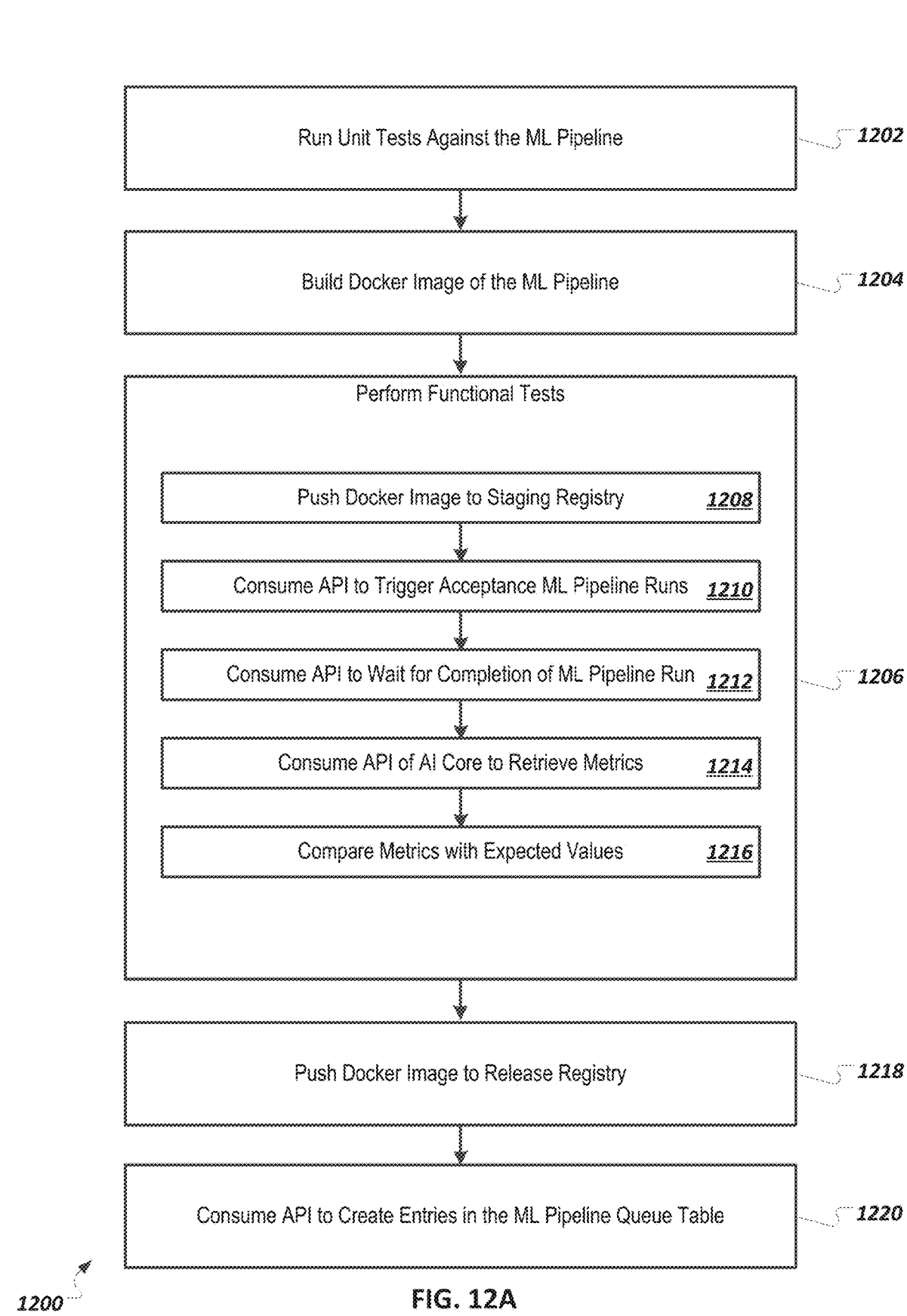
FIG. 12A is a flowchart of an example build process for a machine learning pipeline.

FIG. 12A is a flowchart of an example build process 1200 for a machine learning pipeline. At 1202, unit tests are ran against the ML pipeline with mock data stored in the ML project of the ML pipeline.

At 1204, a Docker image of the ML pipeline is built. Building the Docker image can include skipping all cells (e.g., code snippets) that are not relevant for running the ML pipeline automatically and unattended.

At 1206, functional tests are performed. Performing functional tests can involve various steps. At 1208, the Docker image is pushed to staging registry. At 1210, an API (e.g., the API 1110) is consumed to trigger ML pipeline runs against every configured acceptance test system. Triggering the API can result in the ML pipeline being run if a pre-check is successful. At 1212, an API (e.g., the API 1112) is consumed to wait until the ML pipeline run has completed. At 1214, an API of the AI core component is consumed to retrieve metrics of the completed ML pipeline run. At 1216, the retrieved metrics determined in the ML pipeline run are compared with expected values. At 1218, the Docker image is pushed to a release registry, e.g., if the retrieved metrics are an acceptable match to the expected values. At 1220, an API (e.g., the API 1114) is consumed to create entries in the ML pipeline queue table for every configured customer system. Placing an entry in the ML pipeline queue table can result in execution of the ML pipeline when a corresponding entry of the ML pipeline queue table is retrieved.

FIG. 12B illustrates an example machine learning pipeline runtime process 1230. At 1232, a connection is made to a customer database, based on credentials stored in an AI core component.

At 1234, a domain fit stage (e.g., the domain fit stage 606) is performed.

At 1236, a feature generation stage (e.g., the feature generation stage 608) is performed.

At 1238, a model training stage (e.g., the model training stage 610) is performed. At 1240, the dataset for the pipeline is partitioned. At 1242, processing is performed for each partition. At 1244, for example, one or more baseline models are trained. At 1246, one or more ML models are trained.

At 1248, an evaluation stage (e.g., the evaluation stage 612) is performed. At 1250, processing is performed for each baseline or ML model. For example, at 1252, the dataset the model was trained on is partitioned. At 1254, processing is performed for every partition. For example, at 1256, model debrief data is computed. At 1258, company data statistics are computed. At 1260, metrics are stored using a metrics logging façade (e.g., the metrics logging API 632).

At 1262, clean-up operation(s) are performed on the database schema. For example, any database objects created in any of the above steps of the process 1230 can be deleted. At 1264, a disconnect operation is performed to disconnect from the customer database.

Figure 13A:
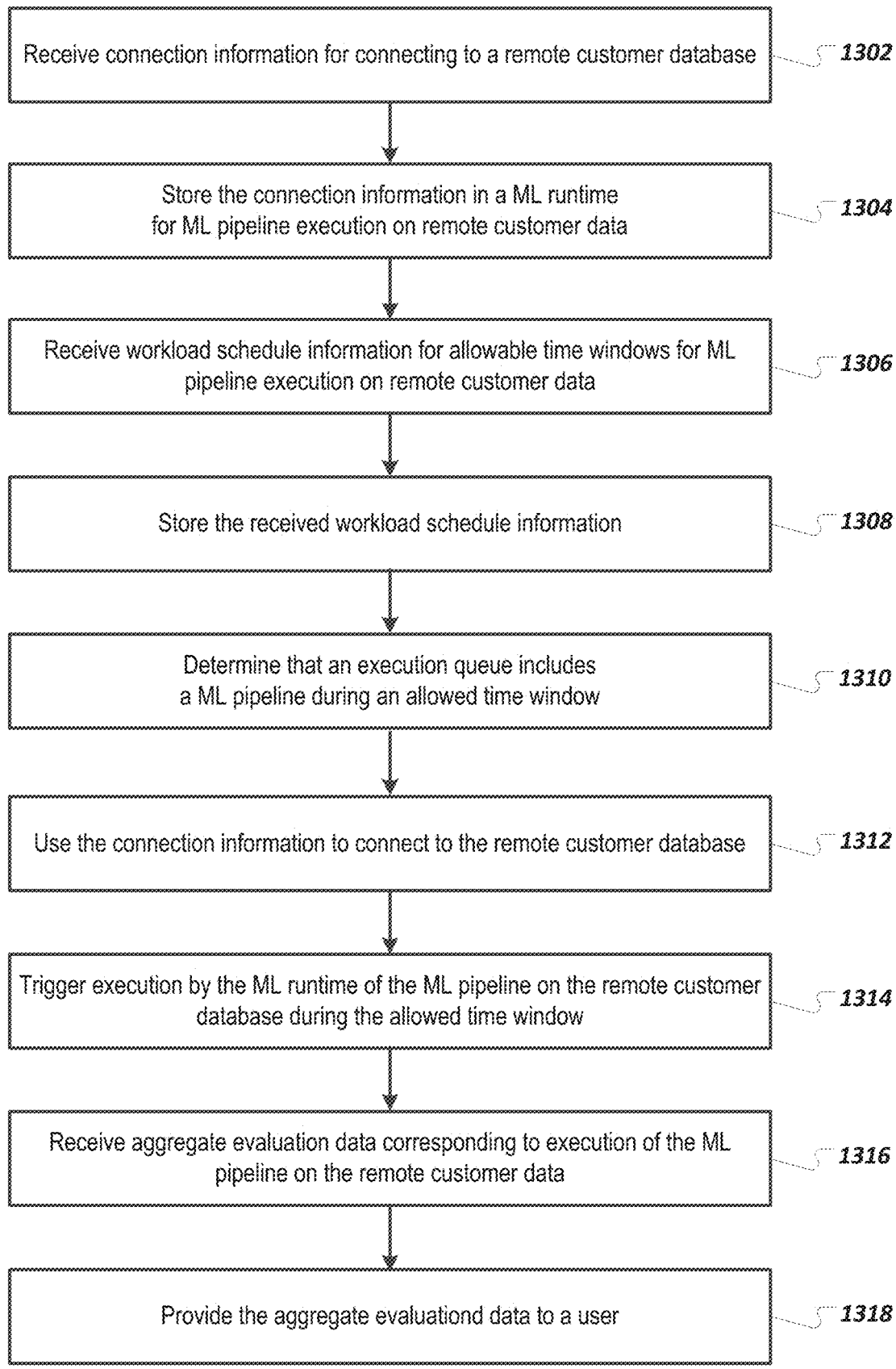
FIG. 13A is a flowchart of an example method for machine learning pipeline execution on remote customer data.

FIG. 13A is a flowchart of an example method 1300 for machine learning pipeline execution on remote customer data. It will be understood that method 1300 and related methods may be performed, for example, by any suitable system, environment, software, and hardware, or a combination of systems, environments, software, and hardware, as appropriate. For example, one or more of a client, a server, or other computing device can be used to execute method 1300 and related methods and obtain any data from the memory of a client, the server, or the other computing device.

At 1302, connection information for connecting to a remote customer database of a customer is received from a customer administrator of the customer. The connection information can be received from the customer administrator after the customer has been onboarded to a customer tenant of a software system for executing machine learning pipelines on remote customer datasets.

At 1304, the connection information for connecting to the remote customer database is stored in a machine learning runtime for machine learning pipeline execution on remote customer data.

At 1306, workload schedule information for allowable time windows for machine learning pipeline execution on remote customer data of the customer is received from the customer administrator.

At 1308, the received workload schedule information is stored.

At 1310, a determination is made that an execution queue includes a machine learning pipeline during an allowed time window. The machine learning pipeline can belong to a machine learning project that includes source code and metadata.

At 1312, the connection information is used to connect to the remote customer database during the allowed time window.

At 1314, execution of the machine learning pipeline by the machine learning runtime on the remote customer database is triggered during the allowed time window. A monitoring request can be received from the customer administrator to monitor execution of the machine learning pipeline. Machine learning pipeline execution information for execution of the machine learning pipeline can be identified and provided to the customer administrator in response to the monitoring request. A monitoring request can be received from a customer data owner to monitor the machine learning project. Information on processed data including a list of processed objects and information on machine learning pipelines including a list of machine learning pipeline executions can be provided to the customer data owner in response to the monitoring request. As another example, evaluation data for a particular machine learning pipeline execution can be provided to the customer data owner in response to the monitoring request.

A halt execution request can be received from the customer administrator to halt execution of the machine learning pipeline. In response to the halt execution request, a halt execution instruction can be provided to the machine learning runtime to halt execution of the machine learning pipeline.

The machine learning runtime can perform a pre-check before executing the machine learning pipeline on the remote customer database. The pre-check can include: determining whether a connection to the remote customer database can be established based on the connection information stored in the machine learning runtime for the customer; identifying a machine learning pipeline database schema associated with the machine learning pipeline; determining whether the machine learning pipeline database schema exists in the remote customer database; determining whether the connection information stored in the machine learning runtime for the customer enables access to the machine learning pipeline database schema in the remote customer database; and determining whether the connection information stored in the machine learning runtime for the customer enables access only to the machine learning pipeline database schema and not other database schemas in the remote customer database.

At 1316, aggregate evaluation data is received corresponding to the execution of the machine learning pipeline on the remote customer database.

At 1318, the aggregate evaluation data is provided to a user. For example, the user can be a data scientist of an entity that serves the customer.

An offboarding request can be received from the customer administrator to offboard the customer the software system for executing machine learning pipelines on remote customer datasets. The customer tenant can be removed from the software system in response to the offboarding request.

Figure 13B:
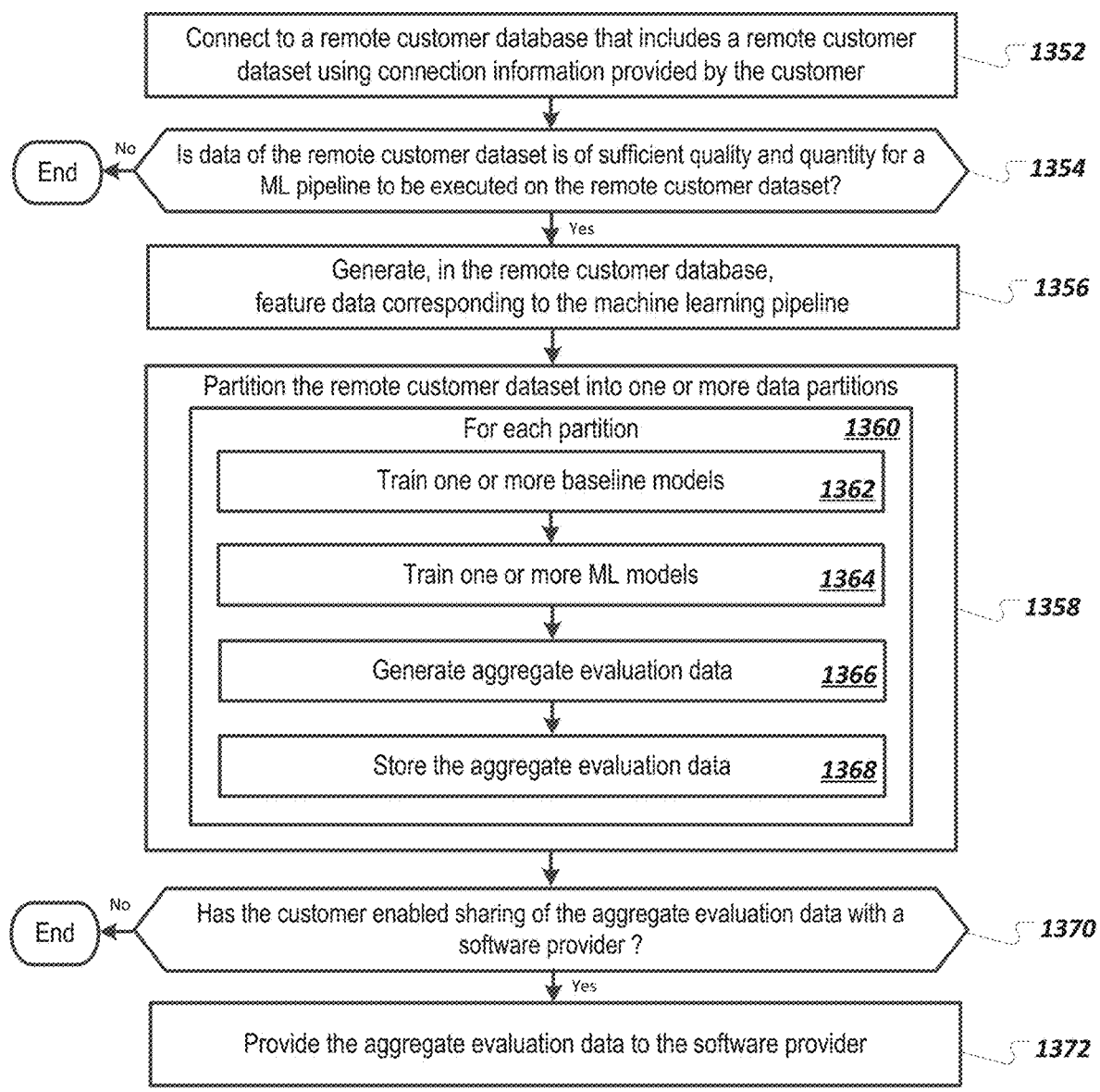
FIG. 13B is a flowchart of an example method for machine learning model execution on a remote customer database of a customer while preserving data confidentiality of customer data.

FIG. 13B is a flowchart of an example method 1350 for machine learning model execution on a remote customer database of a customer while preserving data confidentiality of customer data. It will be understood that method 1350 and related methods may be performed, for example, by any suitable system, environment, software, and hardware, or a combination of systems, environments, software, and hardware, as appropriate. For example, one or more of a client, a server, or other computing device can be used to execute method 1350 and related methods and obtain any data from the memory of a client, the server, or the other computing device.

The method 1350 can be performed, for example, for a machine learning pipeline in response to determining that the machine learning pipeline has been added to an execution queue. The machine learning pipeline can be added to the execution queue after successful completion of a build process. The build process can include: determining that the machine learning pipeline has been checked into a code repository; performing unit testing of the machine learning pipeline; building an executable image of the machine learning pipeline; deploying the executable image of the machine learning pipeline to a staging repository; and performing function testing using the executable image of the machine learning pipeline. Building the executable image can include excluding machine learning pipeline code that has not been flagged for execution on remote customer datasets.

Performing function testing of the machine learning pipeline can include: triggering execution of the machine learning pipeline against at least one acceptance dataset; determining that the execution of the machine learning pipeline against the at least one acceptance dataset has completed; retrieving metrics generated during execution of the machine learning pipeline against the at least one acceptance dataset; comparing the retrieved metrics against expected threshold values; and determining whether the function testing has succeeded based on the comparing.

At 1352, a connection is made to the remote customer database that includes the remote customer dataset using connection information provided by the customer.

At 1354, a determination is made as to whether data of the remote customer dataset is of sufficient quality and quantity for a machine learning pipeline to be executed on the remote customer dataset. If the data of the remote customer dataset is not of sufficient quality and/or quantity for the machine learning pipeline to be executed on the remote customer dataset, the method 1350 ends.

At 1356, in response to determining that data of the remote customer dataset is of sufficient quality and quantity, feature data corresponding to the machine learning pipeline is generated in the remote customer database.

At 1358, the remote customer dataset is partitioned into one or more data partitions.

At 1360, processing is performed for each partition of the one or more data partitions. The machine learning pipeline can access the customer data through a data compatibility layer that abstracts from software version dependent differences. The data compatibility layer can determine a software system and version in use and create views so that a used data model has a common format across different software system versions. Before being processed, numeric customer data can be standardized and categorical customer data can be tokenized.

At 1362, for example, one or more baseline models for the machine learning pipeline and the partition is trained using a machine learning library included in the remote customer database, using a subset of the feature data.

At 1364, one or more machine learning models for the machine learning pipeline and the partition is trained using the machine learning library included in the remote customer database, using the feature data.

At 1366, aggregate evaluation data is generated for the partition for each baseline model and each machine learning model. The aggregate evaluation data can be determined based on a pseudonymized version of original customer data. The aggregate evaluation data can include model debrief data and customer data statistics. The model debrief data can include standard and custom metrics. The company data statistics can include, for each customer data field, a cumulative distribution function for numeric data and a histogram for categorical data.

At 1368, the aggregate evaluation data for the partition is stored.

At 1370, a determination is made as to whether the customer has enabled sharing of the aggregate evaluation data with a software provider who provided the remote customer database to the customer. If the customer has not enabled sharing of the aggregate evaluation data with the software provider, the method 1350 can end.

At 1372, in response to determining that the customer has enabled sharing of the aggregate evaluation data with the software provider, the aggregate evaluation data is provided to the software provider. A set of database objects created in the remote customer database for the machine learning pipeline can be identified and removed from the remote customer database after machine learning pipeline completion. A disconnect operation can be performed to disconnect from the remote customer database after removing the set of database objects created for the machine learning pipeline.

Figure 14:
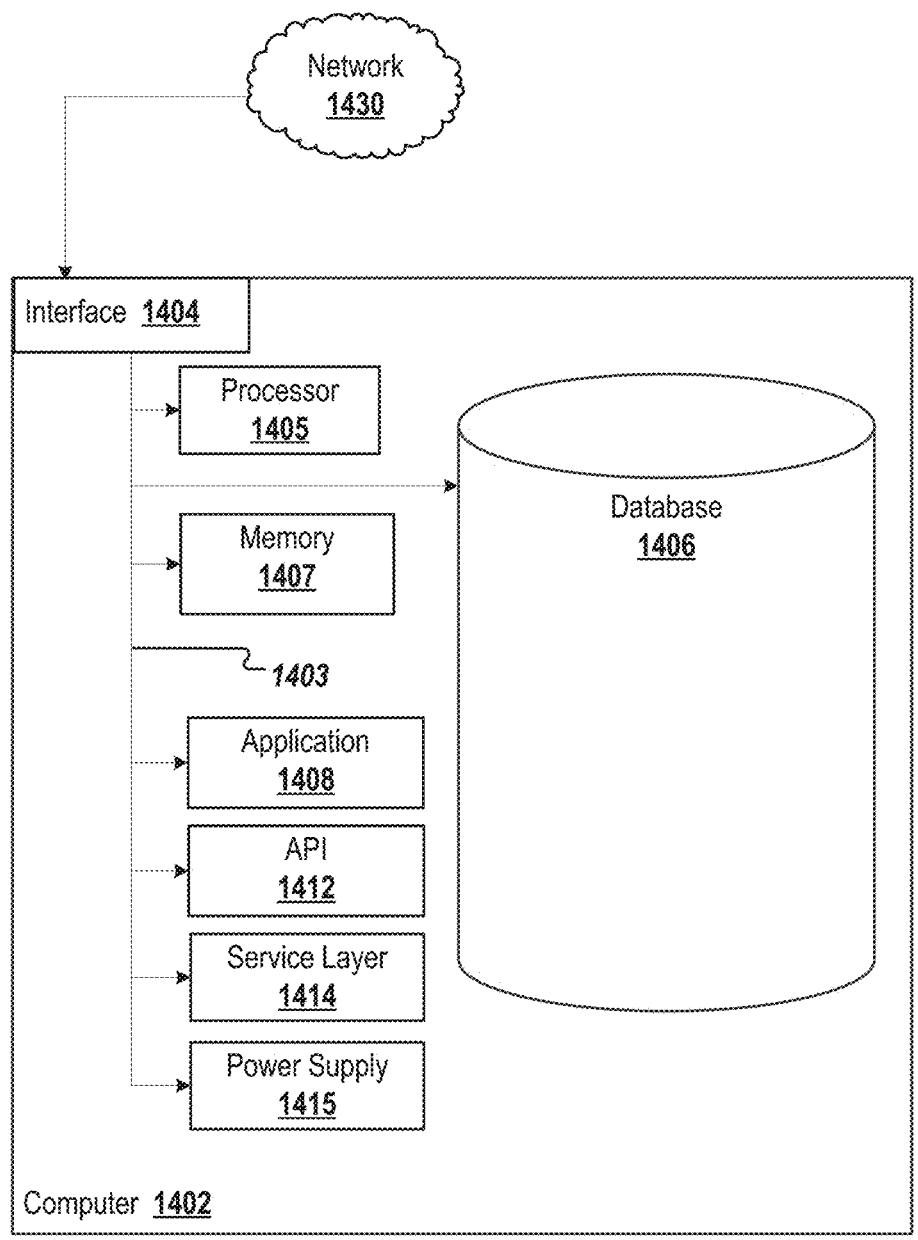
FIG. 14 is a block diagram illustrating an example of a computer-implemented system used to provide computational functionalities associated with described algorithms, methods, functions, processes, flows, and procedures.

FIG. 14 is a block diagram illustrating an example of a computer-implemented System 1400 used to provide computational functionalities associated with described algorithms, methods, functions, processes, flows, and procedures, according to an implementation of the present disclosure. In the illustrated implementation, System 1400 includes a Computer 1402 and a Network 1430.

The illustrated Computer 1402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1402 can include an input device, such as a keypad, keyboard, or touch screen, or a combination of input devices that can accept user information, and an output device that conveys information associated with the operation of the Computer 1402, including digital data, visual, audio, another type of information, or a combination of types of information, on a graphical-type user interface (UI) (or GUI) or other UI.

The Computer 1402 can serve in a role in a distributed computing system as, for example, a client, network component, a server, or a database or another persistency, or a combination of roles for performing the subject matter described in the present disclosure. The illustrated Computer 1402 is communicably coupled with a Network 1430. In some implementations, one or more components of the Computer 1402 can be configured to operate within an environment, or a combination of environments, including cloud-computing, local, or global.

At a high level, the Computer 1402 is an electronic computing device operable to receive, transmit, process, store, or manage data and information associated with the described subject matter. According to some implementations, the Computer 1402 can also include or be communicably coupled with a server, such as an application server, e-mail server, web server, caching server, or streaming data server, or a combination of servers.

The Computer 1402 can receive requests over Network 1430 (for example, from a client software application executing on another Computer 1402) and respond to the received requests by processing the received requests using a software application or a combination of software applications. In addition, requests can also be sent to the Computer 1402 from internal users (for example, from a command console or by another internal access method), external or third-parties, or other entities, individuals, systems, or computers.

Each of the components of the Computer 1402 can communicate using a System Bus 1403. In some implementations, any or all of the components of the Computer 1402, including hardware, software, or a combination of hardware and software, can interface over the System Bus 1403 using an application programming interface (API) 1412, a Service Layer 1414, or a combination of the API 1412 and Service Layer 1414. The API 1412 can include specifications for routines, data structures, and object classes. The API 1412 can be either computer-language independent or dependent and refer to a complete interface, a single function, or even a set of APIs. The Service Layer 1414 provides software services to the Computer 1402 or other components (whether illustrated or not) that are communicably coupled to the Computer 1402. The functionality of the Computer 1402 can be accessible for all service consumers using the Service Layer 1414. Software services, such as those provided by the Service Layer 1414, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1402, alternative implementations can illustrate the API 1412 or the Service Layer 1414 as stand-alone components in relation to other components of the Computer 1402 or other components (whether illustrated or not) that are communicably coupled to the Computer 1402. Moreover, any or all parts of the API 1412 or the Service Layer 1414 can be implemented as a child or a sub-module of another software module, enterprise application, or hardware module without departing from the scope of the present disclosure.

The Computer 1402 includes an Interface 1404. Although illustrated as a single Interface 1404, two or more Interfaces 1404 can be used according to particular needs, desires, or particular implementations of the Computer 1402. The Interface 1404 is used by the Computer 1402 for communicating with another computing system (whether illustrated or not) that is communicatively linked to the Network 1430 in a distributed environment. Generally, the Interface 1404 is operable to communicate with the Network 1430 and includes logic encoded in software, hardware, or a combination of software and hardware. More specifically, the Interface 1404 can include software supporting one or more communication protocols associated with communications such that the Network 1430 or hardware of Interface 1404 is operable to communicate physical signals within and outside of the illustrated Computer 1402.

The Computer 1402 includes a Processor 1405. Although illustrated as a single Processor 1405, two or more Processors 1405 can be used according to particular needs, desires, or particular implementations of the Computer 1402. Generally, the Processor 1405 executes instructions and manipulates data to perform the operations of the Computer 1402 and any algorithms, methods, functions, processes, flows, and procedures as described in the present disclosure.

The Computer 1402 also includes a Database 1406 that can hold data for the Computer 1402, another component communicatively linked to the Network 1430 (whether illustrated or not), or a combination of the Computer 1402 and another component. For example, Database 1406 can be an in-memory or conventional database storing data consistent with the present disclosure. In some implementations, Database 1406 can be a combination of two or more different database types (for example, a hybrid in-memory and conventional database) according to particular needs, desires, or particular implementations of the Computer 1402 and the described functionality. Although illustrated as a single Database 1406, two or more databases of similar or differing types can be used according to particular needs, desires, or particular implementations of the Computer 1402 and the described functionality. While Database 1406 is illustrated as an integral component of the Computer 1402, in alternative implementations, Database 1406 can be external to the Computer 1402.

The Computer 1402 also includes a Memory 1407 that can hold data for the Computer 1402, another component or components communicatively linked to the Network 1430 (whether illustrated or not), or a combination of the Computer 1402 and another component. Memory 1407 can store any data consistent with the present disclosure. In some implementations, Memory 1407 can be a combination of two or more different types of memory (for example, a combination of semiconductor and magnetic storage) according to particular needs, desires, or particular implementations of the Computer 1402 and the described functionality. Although illustrated as a single Memory 1407, two or more Memories 1407 or similar or differing types can be used according to particular needs, desires, or particular implementations of the Computer 1402 and the described functionality. While Memory 1407 is illustrated as an integral component of the Computer 1402, in alternative implementations, Memory 1407 can be external to the Computer 1402.

The Application 1408 is an algorithmic software engine providing functionality according to particular needs, desires, or particular implementations of the Computer 1402, particularly with respect to functionality described in the present disclosure. For example, Application 1408 can serve as one or more components, modules, or applications. Further, although illustrated as a single Application 1408, the Application 1408 can be implemented as multiple Applications 1408 on the Computer 1402. In addition, although illustrated as integral to the Computer 1402, in alternative implementations, the Application 1408 can be external to the Computer 1402.

The Computer 1402 can also include a Power Supply 1415. The Power Supply 1415 can include a rechargeable or non-rechargeable battery that can be configured to be either user- or non-user-replaceable. In some implementations, the Power Supply 1415 can include power-conversion or management circuits (including recharging, standby, or another power management functionality). In some implementations, the Power Supply 1415 can include a power plug to allow the Computer 1402 to be plugged into a wall socket or another power source to, for example, power the Computer 1402 or recharge a rechargeable battery.

There can be any number of Computers 1402 associated with, or external to, a computer system containing Computer 1402, each Computer 1402 communicating over Network 1430. Further, the term "client," "user," or other appropriate terminology can be used interchangeably, as appropriate, without departing from the scope of the present disclosure. Moreover, the present disclosure contemplates that many users can use one Computer 1402, or that one user can use multiple computers 1402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other. While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate. Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure. Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
    receiving, from a customer administrator of a customer, connection information for connecting to a remote customer database of the customer;
    storing the connection information for connecting to the remote customer database in a machine learning runtime for machine learning pipeline execution on remote customer data;
    receiving, from the customer administrator, workload schedule information for allowable time windows for machine learning pipeline execution on remote customer data of the customer;
    storing the received workload schedule information;
    determining that an execution queue includes a machine learning pipeline during an allowed time window;
    using the connection information to connect to the remote customer database during the allowed time window;
    triggering execution by the machine learning runtime of the machine learning pipeline on the remote customer database during the allowed time window;
    receiving aggregate evaluation data corresponding to the execution of the machine learning pipeline on the remote customer database; and
    providing the aggregate evaluation data to a user.

2. The computer-implemented method of claim 1, wherein the connection information is received from the customer administrator after the customer has been onboarded to a customer tenant of a software system for executing machine learning pipelines on remote customer datasets.

3. The computer-implemented method of claim 2, further comprising:
    receiving an offboarding request from the customer administrator to offboard the customer the software system for executing machine learning pipelines on remote customer datasets; and
    removing the customer tenant from the software system in response to the offboarding request.

4. The computer-implemented method of claim 1, further comprising receiving a monitoring request from the customer administrator to monitor execution of the machine learning pipeline.

5. The computer-implemented method of claim 4, further comprising:
    identifying machine learning pipeline execution information for execution of the machine learning pipeline; and providing the machine learning pipeline execution information to the customer administrator in response to the monitoring request.

6. The computer-implemented method of claim 5, further comprising:
receiving a halt execution request from the customer administrator to halt execution of the machine learning pipeline; and
providing, in response to the halt execution request, a halt execution instruction to the machine learning runtime to halt execution of the machine learning pipeline.

7. The computer-implemented method of claim 1, wherein the machine learning runtime performs a pre-check before executing the machine learning pipeline on the remote customer database.

8. The computer-implemented method of claim 7, wherein the pre-check includes:
determining whether a connection to the remote customer database can be established based on the connection information stored in the machine learning runtime for the customer;
identifying a machine learning pipeline database schema associated with the machine learning pipeline;
determining whether the machine learning pipeline database schema exists in the remote customer database;
determining whether the connection information stored in the machine learning runtime for the customer enables access to the machine learning pipeline database schema in the remote customer database; and
determining whether the connection information stored in the machine learning runtime for the customer enables access only to the machine learning pipeline database schema and not other database schemas in the remote customer database.

9. The computer-implemented method of claim 1, wherein the machine learning pipeline belongs to a machine learning project that includes source code and metadata.

10. The computer-implemented method of claim 9, further comprising receiving a monitoring request from a customer data owner to monitor the machine learning project.

11. The computer-implemented method of claim 10, further comprising, providing to the customer data owner, in response to the monitoring request:
information on processed data including a list of processed objects; and
information on machine learning pipelines, including a list of machine learning pipeline executions.

12. The computer-implemented method of claim 11, further comprising providing evaluation data for a particular machine learning pipeline execution in response to the monitoring request.

13. The computer-implemented method of claim 9, wherein the data machine learning project metadata contains a definition of the database tables and fields relevant to the machine learning project.

14. The computer-implemented method of claim 13, wherein, before executing the machine learning pipeline, the machine learning runtime triggers a data replication from a production remote customer database into the remote customer database connected to the machine learning runtime, based on the definition of database tables and fields.

15. A system comprising:
one or more processors; and
a non-transitory computer-readable medium coupled to the one or more processors having instructions stored thereon which, when executed by the one or more processors, cause the one or more processors to perform operations comprising:
receiving, from a customer administrator of a customer, connection information for connecting to a remote customer database of the customer;
storing the connection information for connecting to the remote customer database in a machine learning runtime for machine learning pipeline execution on remote customer data;
receiving, from the customer administrator, workload schedule information for allowable time windows for machine learning pipeline execution on remote customer data of the customer;
storing the received workload schedule information;
determining that an execution queue includes a machine learning pipeline during an allowed time window;
using the connection information to connect to the remote customer database during the allowed time window;
triggering execution by the machine learning runtime of the machine learning pipeline on the remote customer database during the allowed time window;
receiving aggregate evaluation data corresponding to the execution of the machine learning pipeline on the remote customer database; and
providing the aggregate evaluation data to a user.

16. The system of claim 15, wherein the operations further comprise receiving a monitoring request from the customer administrator to monitor execution of the machine learning pipeline.

17. The system of claim 15, wherein the operations further comprise:
identifying machine learning pipeline execution information for execution of the machine learning pipeline; and
providing the machine learning pipeline execution information to the customer administrator in response to the monitoring request.

18. A non-transitory storage medium, the non-transitory storage medium comprising non-transitory, computer readable instructions for causing one or more processors to perform operations comprising:
receiving, from a customer administrator of a customer, connection information for connecting to a remote customer database of the customer;
storing the connection information for connecting to the remote customer database in a machine learning runtime for machine learning pipeline execution on remote customer data;
receiving, from the customer administrator, workload schedule information for allowable time windows for machine learning pipeline execution on remote customer data of the customer;
storing the received workload schedule information;
determining that an execution queue includes a machine learning pipeline during an allowed time window;
using the connection information to connect to the remote customer database during the allowed time window;
triggering execution by the machine learning runtime of the machine learning pipeline on the remote customer database during the allowed time window;
receiving aggregate evaluation data corresponding to the execution of the machine learning pipeline on the remote customer database; and
providing the aggregate evaluation data to a user.

19. The non-transitory storage medium of claim 18, wherein the operations further comprise receiving a monitoring request from the customer administrator to monitor execution of the machine learning pipeline.

20. The non-transitory storage medium of claim 19, wherein the operations further comprise:
- identifying machine learning pipeline execution information for execution of the machine learning pipeline; and
- providing the machine learning pipeline execution information to the customer administrator in response to the monitoring request.

* * * * *